(12) United States Patent
Wang

(10) Patent No.: US 12,470,762 B2
(45) Date of Patent: Nov. 11, 2025

(54) PROJECTION REVERSE CONTROL METHOD AND DEVICE

(71) Applicant: Huawei Technologies Co., Ltd., Shenzhen (CN)

(72) Inventor: Chunfeng Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 48 days.

(21) Appl. No.: 18/564,902

(22) PCT Filed: May 11, 2022

(86) PCT No.: PCT/CN2022/092240
§ 371 (c)(1),
(2) Date: Nov. 28, 2023

(87) PCT Pub. No.: WO2022/252945
PCT Pub. Date: Dec. 8, 2022

(65) Prior Publication Data
US 2024/0388757 A1 Nov. 21, 2024

(30) Foreign Application Priority Data
May 31, 2021 (CN) .......................... 202110603355.X

(51) Int. Cl.
*H04N 21/41* (2011.01)
*H04N 21/4363* (2011.01)

(52) U.S. Cl.
CPC ... *H04N 21/4122* (2013.01); *H04N 21/43637* (2013.01)

(58) Field of Classification Search
CPC ......... H04N 21/4122; H04N 21/43637; H04N 9/31; G06F 3/1454; G06F 9/452; G09G 5/14
See application file for complete search history.

(56) References Cited

U.S. PATENT DOCUMENTS

| | | | | |
|---|---|---|---|---|
| 10,585,637 | B2 * | 3/2020 | Xu | G06F 3/1462 |
| 10,805,672 | B2 * | 10/2020 | Iwami | H04N 21/4383 |
| 10,853,053 | B1 * | 12/2020 | Gordon | G06F 3/017 |
| 11,349,976 | B2 * | 5/2022 | Zhao | G06F 3/1454 |
| 2011/0014947 | A1 * | 1/2011 | Liang | H04M 1/72409 345/660 |

(Continued)

FOREIGN PATENT DOCUMENTS

| | | |
|---|---|---|
| CN | 110597474 A | 12/2019 |
| CN | 211236769 U | 8/2020 |

(Continued)

*Primary Examiner* — Fernando Alcon
(74) *Attorney, Agent, or Firm* — Conley Rose, P.C.

(57) ABSTRACT

In a projection reverse control method a first electronic device sends a projection picture to a second electronic device. The second electronic device is connected to a peripheral device. The first electronic device establishes a connection to the peripheral device. The first electronic device receives a first instruction from the peripheral device. The first instruction is generated by the peripheral device based on a user operation. The first electronic device performs a corresponding operation according to the first instruction. The first electronic device sends, to the second electronic device, a projection picture after the corresponding operation is performed.

20 Claims, 17 Drawing Sheets

(56) References Cited

U.S. PATENT DOCUMENTS

| | | | |
|---|---|---|---|
| 2011/0225330 A1* | 9/2011 | Lavian | H04M 1/72409 |
| | | | 710/63 |
| 2012/0038678 A1* | 2/2012 | Hwang | G06F 3/1454 |
| | | | 345/667 |
| 2013/0027289 A1* | 1/2013 | Choi | H04N 21/4222 |
| | | | 345/156 |
| 2014/0101574 A1* | 4/2014 | Maynard | G06F 3/0484 |
| | | | 715/761 |
| 2021/0084136 A1* | 3/2021 | Zhao | H04L 67/06 |
| 2022/0066725 A1* | 3/2022 | Xia | G06F 3/0488 |
| 2022/0300153 A1* | 9/2022 | Gu | G06F 3/1454 |
| 2023/0376131 A1* | 11/2023 | Zeung | H04M 1/72412 |
| 2024/0168574 A1* | 5/2024 | Zeung | G06F 3/03547 |

FOREIGN PATENT DOCUMENTS

| | | | | |
|---|---|---|---|---|
| CN | 112558825 A | 3/2021 | | |
| WO | WO-2011084855 A1 * | 7/2011 | | G06F 3/041 |

* cited by examiner

PROJECTION REVERSE CONTROL METHOD AND DEVICE

CROSS-REFERENCE TO RELATED APPLICATIONS

This is a U.S. National Stage of International Patent Application No. PCT/CN2022/092240 filed on May 11, 2022, which claims priority to Chinese Patent Application No. 202110603355.X filed on May 31, 2021. Both of the aforementioned applications are hereby incorporated by reference in their entireties.

TECHNICAL FIELD

Embodiments of this application relate to the field of electronic devices, and in particular, to a projection reverse control method and a device.

BACKGROUND

When a mobile phone is wirelessly projected to another electronic device (for example, a computer or a smart screen), pictures on the mobile phone and sounds played by the mobile phone are usually transmitted to the another electronic device through a wireless fidelity (wireless fidelity, Wi-Fi) direct connection or a Wi-Fi local area network connection. Generally, data transmitted by the mobile phone to the electronic device to which the mobile phone is projected during projection includes video stream data and audio stream data.

To facilitate reverse control performed by a user on the mobile phone by using the electronic device to which the mobile phone is projected during projection, a signaling channel, for example, a user input back channel (user input back channel, UIBC), is set between the mobile phone and the electronic device to which the mobile phone is projected. Instructions corresponding to operations performed by the user on the electronic device to which the mobile phone is projected can be transmitted to the mobile phone through the signaling channel, so that the mobile phone makes corresponding responses. For example, after the user projects the mobile phone to a computer, when the user performs, by using a mouse of the computer, operations on controls in a picture projected from the mobile phone, the computer may transmit, to the mobile phone through a signaling channel between the mobile phone and the computer, instructions corresponding to the operations performed by the user with the mouse, so that the mobile phone makes corresponding responses to the received instructions.

However, after receiving an operation performed by the user, the electronic device to which the mobile phone is projected needs to first process the user operation (for example, perform parsing, packaging, or the like processing on the instruction corresponding to the user operation), and then transmit the instruction corresponding to the user operation to the mobile phone through the signaling channel, so that the mobile phone makes a corresponding response to the instruction. Because the electronic device to which the mobile phone is projected needs to process the user operation, a long latency occurs when the mobile phone receives the instruction corresponding to the user operation.

SUMMARY

Embodiments of this application provide a projection reverse control method and a device, to solve a problem that a long latency occurs when a projected electronic device receives an instruction corresponding to a user operation during projection reverse control.

To achieve the foregoing objective, the following technical solutions are used in embodiments of this application.

According to a first aspect, an embodiment of this application provides a projection reverse control method. The method may be applied to a first electronic device in a projection system. The projection system may further include a second electronic device. The method includes: The first electronic device sends a projection picture to the second electronic device. The second electronic device is connected to a peripheral device. The peripheral device is configured to perform operation control on a picture displayed by the second electronic device. The first electronic device establishes a connection to the peripheral device. The first electronic device receives a first instruction sent by the peripheral device. The first instruction is generated by the peripheral device based on a user operation. The first electronic device performs a corresponding operation according to the first instruction. The first electronic device sends, to the second electronic device, a projection picture after the corresponding operation is performed.

With the foregoing technical solution, in a case in which the first electronic device is projected to the second electronic device, when a user performs reverse control on the first electronic device on the second electronic device, an instruction corresponding to an operation performed by the user by using the peripheral device of the second electronic device can be directly sent by the peripheral device of the second electronic device to the first electronic device, so that the first electronic device makes a corresponding response based on the user operation. Therefore, the second electronic device does not need to first receive and process the instruction sent by the peripheral device of the second electronic device and then transmit the instruction to the first electronic device. This simplifies a path for control instruction transmission during reverse control performed by the user on the first electronic device by using the peripheral device of the second electronic device, further improves a reverse control latency in a projection state, quickens a response of a projected electronic device (that is, the first electronic device) to the user operation, and improves hand-following performance, relative to the user operation, of the projection picture displayed by an electronic device to which the projected electronic device is projected (that is, the second electronic device).

In a possible implementation, before the first electronic device establishes the connection to the peripheral device, the method further includes: The first electronic device receives connection information of the peripheral device sent by the second electronic device. The connection information is information for connecting the second electronic device to the peripheral device. That the first electronic device establishes a connection to the peripheral device includes: The first electronic device establishes the connection to the peripheral device based on the connection information.

In this way, the first electronic device can be directly connected to the peripheral device based on the connection information for connecting the second electronic device to the peripheral device. Therefore, convenience in connecting the first electronic device to the peripheral device is improved, and a connection process during establishment of the connection between the first electronic device and the peripheral device is simplified.

In another possible implementation, that the first electronic device receives connection information of the peripheral device sent by the second electronic device includes: The first electronic device receives the connection information during real-time negotiation protocol parameter negotiation with the second electronic device: or the first electronic device receives the connection information in a case of establishment of a trusted connection to the second electronic device and/or login with a same account.

In this way, the first electronic device and the second electronic device can synchronize the connection information when the first electronic device and the second electronic device have a trusted connection relationship or need to perform projection. Therefore, security is improved when the first electronic device receives the connection information sent by the second electronic device.

In another possible implementation, the connection information includes a physical address of the peripheral device and a token (token) for connection verification.

In this way, the first electronic device can be conveniently and quickly connected to the peripheral device based on the physical address of the peripheral device, without a need to first search for and discover the peripheral device. In addition, with the token, authentication can be conveniently and effectively performed between the first electronic device and the peripheral device, so that the first electronic device can be securely connected to the peripheral device.

In another possible implementation, the second electronic device displays the projection picture of the first electronic device in full screen.

In another possible implementation, the second electronic device displays the projection picture of the first electronic device in non-full screen. The method further includes. The first electronic device receives location information that is of the projection picture on a display of the second electronic device and that is sent by the second electronic device. That the first electronic device performs a corresponding operation according to the first instruction includes: When the first electronic device determines, based on the location information of the projection picture on the display of the second electronic device, that the user operation corresponding to the first instruction is in the projection picture of the first electronic device, the first electronic device performs the corresponding operation according to the first instruction.

In this way, when the second electronic device displays the projection picture of the first electronic device in non-full screen, it can be first determined, according to the received instruction of the peripheral device, that the user operation is in the projection picture of the first electronic device, and then a related operation is performed in response to the instruction. Therefore, invalid processing performed by the first electronic device on an operation that is not performed on the first electronic device is avoided. Correspondingly, when the second electronic device displays the projection picture of the first electronic device in non-full screen, the second electronic device may alternatively receive the instruction sent by the peripheral device, and then determine, according to the instruction, whether the user operation is outside the projection picture of the first electronic device. If the user operation is outside the projection picture of the second electronic device, the second electronic device performs a related operation in response to the instruction.

In another possible implementation, the second electronic device displays the projection picture of the first electronic device in non-full screen. The method further includes: The first electronic device receives location information that is of the projection picture on a display of the second electronic device and that is sent by the second electronic device. The first electronic device determines, based on the location information of the projection picture on the display of the second electronic device, whether the user operation corresponding to the first instruction is outside the projection picture of the first electronic device. When the first electronic device determines that the user operation corresponding to the first instruction is outside the projection picture of the first electronic device, the first electronic device does not execute the first instruction.

In this way, when the second electronic device displays the projection picture of the first electronic device in non-full screen, it can be first determined, according to the received instruction of the peripheral device, that the user operation is in the projection picture of the first electronic device, and then a related operation is performed in response to the instruction. Therefore, invalid processing performed by the first electronic device on an operation that is not performed on the first electronic device is avoided.

In another possible implementation, the second electronic device is wirelessly connected to the peripheral device. The first electronic device is wirelessly connected to the peripheral device.

In another possible implementation, the second electronic device is wirelessly connected to the peripheral device through Bluetooth or Wi-Fi. The first electronic device is wirelessly connected to the peripheral device through Bluetooth or Wi-Fi.

In another possible implementation, the peripheral device includes any one of the following: a mouse, a keyboard, a stylus, and a handle. The first instruction includes any one of the following: movement information of the mouse or the stylus, and typing information of the keyboard or the handle. The movement information includes a movement distance and a movement direction.

According to a second aspect, an embodiment of this application provides a projection reverse control apparatus. The apparatus may be used in a first electronic device in a projection system, and is configured to implement the method in the first aspect. A function of the apparatus may be implemented by hardware, or may be implemented by corresponding software executed by hardware. The hardware or the software includes one or more modules corresponding to the foregoing function, for example, a projection module, a connection module, and a processing module.

The projection module may be configured to send a projection picture to a second electronic device. The second electronic device is connected to a peripheral device. The peripheral device is configured to perform operation control on a picture displayed by the second electronic device. The connection module may be configured to: establish a connection to the peripheral device; and receive a first instruction sent by the peripheral device. The first instruction is generated by the peripheral device based on a user operation. The processing module may be configured to perform a corresponding operation according to the first instruction. The projection module may be further configured to send, to the second electronic device, a projection picture after the corresponding operation is performed.

In a possible implementation, the connection module is further configured to receive connection information of the peripheral device sent by the second electronic device. The connection information is information for connecting the second electronic device to the peripheral device. The connection module is specifically configured to establish the connection to the peripheral device based on the connection information.

In another possible implementation, the connection module is specifically configured to receive the connection information during real-time negotiation protocol parameter negotiation between the first electronic device and the second electronic device, or receive the connection information in a case of establishment of a trusted connection between the first electronic device and the second electronic device and/or login with a same account.

In another possible implementation, the connection information includes a physical address of the peripheral device and a token (token) for connection verification.

In another possible implementation, the second electronic device displays the projection picture of the first electronic device in full screen.

In another possible implementation, the second electronic device displays the projection picture of the first electronic device in non-full screen. The connection module is further configured to receive location information that is of the projection picture on a display of the second electronic device and that is sent by the second electronic device. The processing module is specifically configured to: when determining, based on the location information of the projection picture on the display of the second electronic device, that the user operation corresponding to the first instruction is in the projection picture of the first electronic device, perform the corresponding operation according to the first instruction.

In another possible implementation, the second electronic device displays the projection picture of the first electronic device in non-full screen. The connection module is further configured to receive location information that is of the projection picture on a display of the second electronic device and that is sent by the second electronic device. The processing module is further configured to: determine, based on the location information of the projection picture on the display of the second electronic device, whether the user operation corresponding to the first instruction is outside the projection picture of the first electronic device; and when determining that the user operation corresponding to the first instruction is outside the projection picture of the first electronic device, not execute the first instruction.

In another possible implementation, the second electronic device is wirelessly connected to the peripheral device. The first electronic device is wirelessly connected to the peripheral device.

In another possible implementation, the second electronic device is wirelessly connected to the peripheral device through Bluetooth or Wi-Fi. The first electronic device is wirelessly connected to the peripheral device through Bluetooth or Wi-Fi.

In another possible implementation, the peripheral device includes any one of the following: a mouse, a keyboard, a stylus, and a handle. The first instruction includes any one of the following: movement information of the mouse or the stylus, and typing information of the keyboard or the handle. The movement information includes a movement distance and a movement direction.

According to a third aspect, an embodiment of this application provides an electronic device, including a processor and a memory configured to store instructions executable by the processor. The processor is configured to execute the instructions to enable the electronic device to implement the projection reverse control method in any one of the first aspect or the possible implementations of the first aspect.

According to a fourth aspect, an embodiment of this application provides a computer-readable storage medium storing computer program instructions thereon. When the computer program instructions are executed by an electronic device, the electronic device is enabled to implement the projection reverse control method in any one of the first aspect or the possible implementations of the first aspect.

According to a fifth aspect, an embodiment of this application provides a computer program product, including computer-readable code. When the computer-readable code is run in an electronic device, the electronic device is enabled to implement the projection reverse control method in any one of the first aspect or the possible implementations of the first aspect.

It should be understood that, for beneficial effects of the second aspect to the fifth aspect, reference may be made to related descriptions in the first aspect. Details are not described herein again.

According to a sixth aspect, an embodiment of this application provides a projection reverse control method. The method may be applied to a second electronic device in a projection system. The projection system may further include a first electronic device. The method includes: The second electronic device receives and displays a projection picture of the first electronic device. The second electronic device is connected to a peripheral device. The peripheral device is configured to perform operation control on a picture displayed by the second electronic device. The second electronic device displays the projection picture of the first electronic device in non-full screen. The second electronic device receives a first instruction of the peripheral device. The first instruction is generated by the peripheral device based on a user operation. When the second electronic device determines that the user operation corresponding to the first instruction is outside the projection picture of the first electronic device, the second electronic device performs a corresponding operation according to the first instruction.

With the foregoing technical solution, in a case in which the first electronic device is projected to the second electronic device, when a user performs reverse control on the first electronic device on the second electronic device, an instruction corresponding to an operation performed by the user by using the peripheral device of the second electronic device can be directly sent by the peripheral device of the second electronic device to the first electronic device, so that the first electronic device makes a corresponding response based on the user operation. Therefore, the second electronic device does not need to first receive and process the instruction sent by the peripheral device of the second electronic device and then transmit the instruction to the first electronic device. This simplifies a path for control instruction transmission during reverse control performed by the user on the first electronic device by using the peripheral device of the second electronic device, further improves a reverse control latency in a projection state, quickens a response of a projected electronic device (that is, the first electronic device) to the user operation, and improves hand-following performance, relative to the user operation, of the projection picture displayed by an electronic device to which the projected electronic device is projected (that is, the second electronic device) In addition, when the second electronic device displays the projection picture of the first electronic device in non-full screen, the second electronic device may receive the instruction sent by the peripheral device, and perform an operation corresponding to the received instruction when determining, according to the received instruction of the peripheral device, that the user operation is outside the projection picture of the first electronic device (that is, the user operation is on an interface of the second electronic device). Therefore, a case that the second electronic device makes no response when the user operates the interface of the second electronic device is avoided.

In a possible implementation, the method further includes: The second electronic device sends connection information of the peripheral device to the first electronic device. The connection information is information for connecting the second electronic device to the peripheral device.

In this way, the first electronic device can be directly connected to the peripheral device based on the connection information for connecting the second electronic device to the peripheral device. Therefore, convenience in connecting the first electronic device to the peripheral device is improved, and a connection process during establishment of the connection between the first electronic device and the peripheral device is simplified.

In another possible implementation, that the second electronic device sends connection information of the peripheral device to the first electronic device includes: The second electronic device sends the connection information to the first electronic device during real-time negotiation protocol parameter negotiation with the first electronic device; or the second electronic device synchronizes the connection information to the first electronic device in a case of establishment of a trusted connection to the first electronic device and/or login with a same account.

In this way, the first electronic device and the second electronic device can synchronize the connection information when the first electronic device and the second electronic device have a trusted connection relationship or need to perform projection. Therefore, security is improved when the first electronic device receives the connection information sent by the second electronic device.

In another possible implementation, the connection information includes a physical address of the peripheral device and a token (token) for connection verification.

In this way, the first electronic device can be conveniently and quickly connected to the peripheral device based on the physical address of the peripheral device, without a need to first search for and discover the peripheral device. In addition, with the token, authentication can be conveniently and effectively performed between the first electronic device and the peripheral device, so that the first electronic device can be securely connected to the peripheral device.

In another possible implementation, the method further includes: The second electronic device sends location information of the projection picture on a display of the second electronic device to the first electronic device.

In this way, the first electronic device can determine, based on the location information of the projection picture on the display of the second electronic device, whether the user operation is in the projection picture of the first electronic device.

In another possible implementation, the method further includes: When the user operation corresponding to the first instruction is in the projection picture of the first electronic device, the second electronic device receives and displays a projection picture that is sent by the first electronic device after the corresponding operation is performed.

In this way, when the projection picture of the first electronic device changes after the first electronic device performs the corresponding operation according to the received first instruction of the peripheral device, the first electronic device may project the changed picture onto the second electronic device. Optionally, the first electronic device may send the projection picture to the second electronic device in real time, so that the second electronic device displays, in real time, the picture projected from the first electronic device.

In another possible implementation, the method further includes: when the user operation corresponding to the first instruction is in the projection picture of the first electronic device, not executing the first instruction.

In another possible implementation, the second electronic device is wirelessly connected to the peripheral device. The first electronic device is wirelessly connected to the peripheral device.

In another possible implementation, the second electronic device is wirelessly connected to the peripheral device through Bluetooth or Wi-Fi. The first electronic device is wirelessly connected to the peripheral device through Bluetooth or Wi-Fi.

In another possible implementation, the peripheral device includes any one of the following: a mouse, a keyboard, a stylus, and a handle. The first instruction includes any one of the following: movement information of the mouse or the stylus, and typing information of the keyboard or the handle. The movement information includes a movement distance and a movement direction.

According to a seventh aspect, an embodiment of this application provides a projection reverse control apparatus. The apparatus may be used in a second electronic device in a projection system, and is configured to implement the method in the sixth aspect. A function of the apparatus may be implemented by hardware, or may be implemented by corresponding software executed by hardware. The hardware or the software includes one or more modules corresponding to the foregoing function, for example, a projection module, a connection module, and a processing module.

The projection module may be configured to receive and display a projection picture of a first electronic device. The second electronic device is connected to a peripheral device. The peripheral device is configured to perform operation control on a picture displayed by the second electronic device. The second electronic device displays the projection picture of the first electronic device in non-full screen. The connection module is configured to receive a first instruction of the peripheral device when the second electronic device displays the projection picture of the first electronic device in non-full screen. The first instruction is generated by the peripheral device based on a user operation. The processing module is configured to: when determining that the user operation corresponding to the first instruction is outside the projection picture of the first electronic device, perform a corresponding operation according to the first instruction.

In a possible implementation, the connection module is further configured to send connection information of the peripheral device to the first electronic device. The connection information is information for connecting the second electronic device to the peripheral device.

In another possible implementation, the connection module is specifically configured to send the connection information to the first electronic device during real-time negotiation protocol parameter negotiation between the second electronic device and the first electronic device, or synchronize the connection information to the first electronic device in a case of establishment of a trusted connection between the second electronic device and the first electronic device and/or login with a same account.

In another possible implementation, the connection information includes a physical address of the peripheral device and a token (token) for connection verification.

In another possible implementation, the connection module is further configured to send location information of the projection picture on a display of the second electronic device to the first electronic device.

In another possible implementation, the projection module is further configured to: when the user operation corresponding to the first instruction is in the projection picture of the first electronic device, receive and display a projection picture that is sent by the first electronic device after the corresponding operation is performed.

In another possible implementation, the processing module is further configured to: when the user operation corresponding to the first instruction is in the projection picture of the first electronic device, not execute the first instruction.

In another possible implementation, the second electronic device is wirelessly connected to the peripheral device. The first electronic device is wirelessly connected to the peripheral device.

In another possible implementation, the second electronic device is wirelessly connected to the peripheral device through Bluetooth or Wi-Fi. The first electronic device is wirelessly connected to the peripheral device through Bluetooth or Wi-Fi.

In another possible implementation, the peripheral device includes any one of the following: a mouse, a keyboard, a stylus, and a handle. The first instruction includes any one of the following: movement information of the mouse or the stylus, and typing information of the keyboard or the handle. The movement information includes a movement distance and a movement direction.

According to an eighth aspect, an embodiment of this application provides an electronic device, including a processor and a memory configured to store instructions executable by the processor. The processor is configured to execute the instructions to enable the electronic device to implement the projection reverse control method in any one of the sixth aspect or the possible implementations of the sixth aspect.

According to a ninth aspect, an embodiment of this application provides a computer-readable storage medium storing computer program instructions thereon. When the computer program instructions are executed by an electronic device, the electronic device is enabled to implement the projection reverse control method in any one of the sixth aspect or the possible implementations of the sixth aspect.

According to a tenth aspect, an embodiment of this application provides a computer program product, including computer-readable code. When the computer-readable code is run in an electronic device, the electronic device is enabled to implement the projection reverse control method in any one of the sixth aspect or the possible implementations of the sixth aspect.

It should be understood that, for beneficial effects of the seventh aspect to the tenth aspect, reference may be made to related descriptions in the sixth aspect. Details are not described herein again.

According to an eleventh aspect, an embodiment of this application provides a projection reverse control method. The method may be applied to a projection system. The projection system includes a first electronic device and a second electronic device that are connected to each other, and a peripheral device connected to the second electronic device. The peripheral device is configured to perform operation control on a picture displayed by the second electronic device. The method includes: The first electronic device sends a projection picture to the second electronic device. The second electronic device receives and displays the projection picture sent by the first electronic device. The first electronic device establishes a connection to the peripheral device. The peripheral device generates, in response to a user operation, a first instruction based on the user operation. The peripheral device sends the first instruction to the first electronic device. The first electronic device receives the first instruction sent by the peripheral device. The first electronic device performs a corresponding operation according to the first instruction. The first electronic device sends, to the second electronic device, a projection picture after the corresponding operation is performed. The second electronic device receives and displays the projection picture that is sent by the first electronic device after the corresponding operation is performed.

In a possible implementation, before the first electronic device establishes the connection to the peripheral device, the method further includes: The second electronic device sends connection information of the peripheral device to the first electronic device. The connection information is information for connecting the second electronic device to the peripheral device. The first electronic device receives the connection information sent by the second electronic device. That the first electronic device establishes a connection to the peripheral device includes: The first electronic device establishes the connection to the peripheral device based on the connection information.

In another possible implementation, that the second electronic device sends connection information of the peripheral device to the first electronic device includes: The second electronic device sends the connection information to the first electronic device during real-time negotiation protocol parameter negotiation with the first electronic device: or the second electronic device synchronizes the connection information to the first electronic device in a case of establishment of a trusted connection to the first electronic device and/or login with a same account.

In another possible implementation, the connection information includes a physical address of the peripheral device and a token (token) for connection verification.

In another possible implementation, the second electronic device displays the projection picture of the first electronic device in full screen.

In another possible implementation, the second electronic device displays the projection picture of the first electronic device in non-full screen. The method further includes. The second electronic device sends location information of the projection picture on a display of the second electronic device to the first electronic device. The first electronic device receives the location information that is of the projection picture on the display of the second electronic device and that is sent by the second electronic device. That the first electronic device performs a corresponding operation according to the first instruction includes: When the first electronic device determines, based on the location information of the projection picture on the display of the second electronic device, that the user operation corresponding to the first instruction is in the projection picture of the first electronic device, the first electronic device performs the corresponding operation according to the first instruction; or when the first electronic device determines, based on the location information of the projection picture on the display of the second electronic device, that the user operation corresponding to the first instruction is outside the projection picture of the first electronic device, the first electronic device does not execute the first instruction.

In another possible implementation, the method further includes: The peripheral device sends the first instruction to the second electronic device. The second electronic device receives the first instruction of the peripheral device. When the second electronic device determines that the user operation corresponding to the first instruction is outside the projection picture of the first electronic device, the second electronic device performs the corresponding operation according to the first instruction; or when the second electronic device determines that the user operation corresponding to the first instruction is in the projection picture of the first electronic device, the second electronic device does not execute the first instruction.

In another possible implementation, the second electronic device is wirelessly connected to the peripheral device. The first electronic device is wirelessly connected to the peripheral device.

In another possible implementation, the second electronic device is wirelessly connected to the peripheral device through Bluetooth or Wi-Fi. The first electronic device is wirelessly connected to the peripheral device through Bluetooth or Wi-Fi.

In another possible implementation, the peripheral device includes any one of the following: a mouse, a keyboard, a stylus, and a handle. The first instruction includes any one of the following: movement information of the mouse or the stylus, and typing information of the keyboard or the handle. The movement information includes a movement distance and a movement direction.

According to a twelfth aspect, an embodiment of this application provides a projection system. The projection system includes a first electronic device and a second electronic device that are connected to each other, and a peripheral device connected to the second electronic device. The peripheral device is configured to perform operation control on a projection picture. The projection system may be configured to perform the projection reverse control method in any one of the eleventh aspect or the possible implementations of the eleventh aspect.

It should be understood that, for beneficial effects of the eleventh aspect and the twelfth aspect, reference may be made to related descriptions in the first aspect and the sixth aspect. Details are not described herein again.

DESCRIPTION OF EMBODIMENTS

Currently, a wireless projection technology is increasingly mature. People can project, by using the wireless projection technology, content displayed on a specific electronic device (for example, a mobile phone or a tablet) to another electronic device (for example, a computer, a smart television, or a smart screen), to implement a multi-screen collaboration or screen sharing function. To facilitate reverse control performed by a user on a projected electronic device by using an electronic device to which the projected electronic device is projected during projection, a signaling channel, for example, a user input back channel (user input back channel, UIBC), is set between the projected electronic device and the electronic device to which the projected electronic device is projected. An instruction corresponding to an operation performed by the user on the electronic device to which the projected electronic device is projected can be transmitted to the mobile phone through the signaling channel, so that the mobile phone makes a corresponding response.

Figure 1:
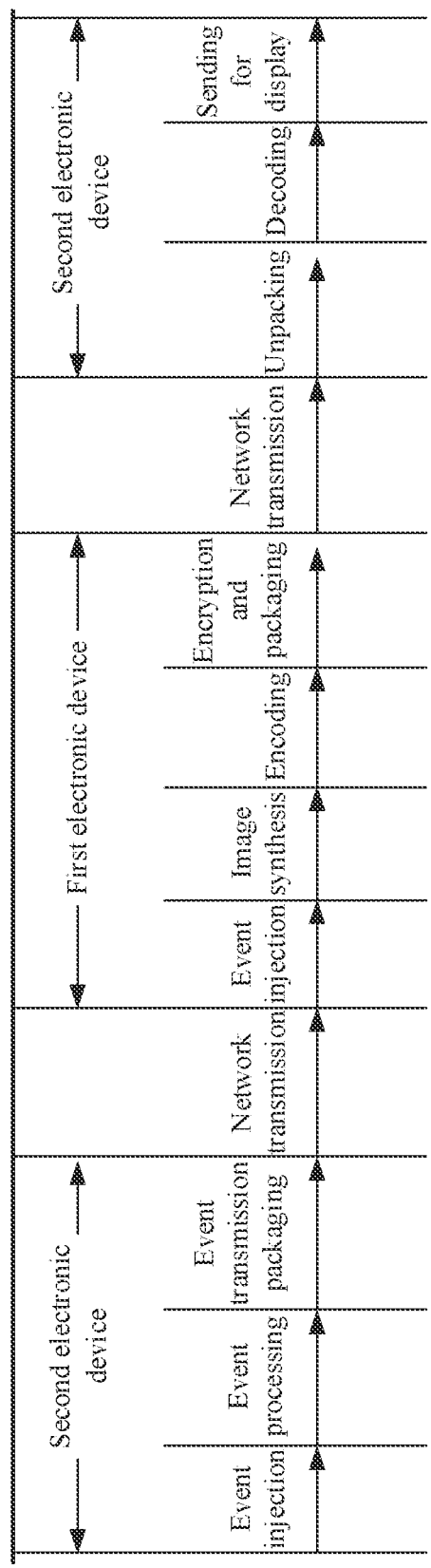
FIG. 1 is a schematic flowchart of a projection reverse control method according to the conventional technology.

An example in which the user performs reverse control on a first electronic device by using a second electronic device when the first electronic device is projected to the second electronic device is used. FIG. 1 is a schematic flowchart of a projection reverse control method according to the conventional technology. As shown in FIG. 1, the projection reverse control method may include: The second electronic device receives an instruction corresponding to a user operation (or referred to as event injection), and then processes the instruction (or referred to as event processing). After processing the received instruction, the second electronic device may package the processed instruction (or referred to as event transmission packaging), and then transmit the packaged instruction to the first electronic device through a network (for example, a signaling channel). After the first electronic device receives the instruction transmitted by the second electronic device (or referred to as event injection), the first electronic device may perform image synthesis in response to the received instruction. After completing image synthesis, the first electronic device may perform image encoding, encryption, and packaging on a synthesized image, and then transmit the encrypted and packaged image to the second electronic device through a network (for example, a link formed by connecting the first electronic device to the second electronic device in a form of wireless fidelity (wireless fidelity, Wi-Fi) direct connection or a Wi-Fi local area network connection). After receiving the packaged image transmitted by the first electronic device, the second electronic device may unpack and decode the packaged image, and then send the decoded image to a display module for display (or referred to as sending for display).

For example, the user may project a display interface of the mobile phone to the computer by using the wireless projection technology, and then perform, on the computer by using a mouse, a keyboard, or another device, an operation on the display interface of the mobile phone displayed on the computer, to perform reverse control on the mobile phone. In this way, the multi-screen collaboration function is implemented to view and use the mobile phone on the computer. When the user performs, on the computer by using the mouse, the key board, or another device, the operation on the display interface of the mobile phone displayed on the computer (for example, the user performs, by using the mouse, an operation like clicking and dragging on a control on the display interface of the mobile phone displayed on the computer), after the computer receives an instruction that is sent by the mouse and that corresponds to the user operation, the computer may first process the instruction sent by the mouse (for example, parse the instruction), and then package and send the processed instruction to the mobile phone through the signaling channel, so that the mobile phone makes a corresponding response after receiving the instruction.

It can be learned from the foregoing that, when the user performs reverse control on the projected electronic device (that is, the first electronic device shown in FIG. 1) by using the electronic device to which the projected electronic device is projected (that is, the second electronic device shown in FIG. 1), after receiving the user operation, the electronic device to which the projected electronic device is projected needs to first process the user operation, and then transmit the instruction corresponding to the user operation to the projected electronic device, so that the projected electronic device makes a corresponding response to the instruction. Because the electronic device to which the projected electronic device is projected needs to process the user operation, a long latency occurs when the projected electronic device receives the instruction corresponding to the user operation. To be specific, after the user performs the operation on the electronic device to which the projected electronic device is projected, a time required by the projected electronic device to make the corresponding response is long. Therefore, when the user performs reverse control during projection, hand-following performance of a projection picture displayed on the electronic device to which the projected electronic device is projected is poor.

Figure 2A:
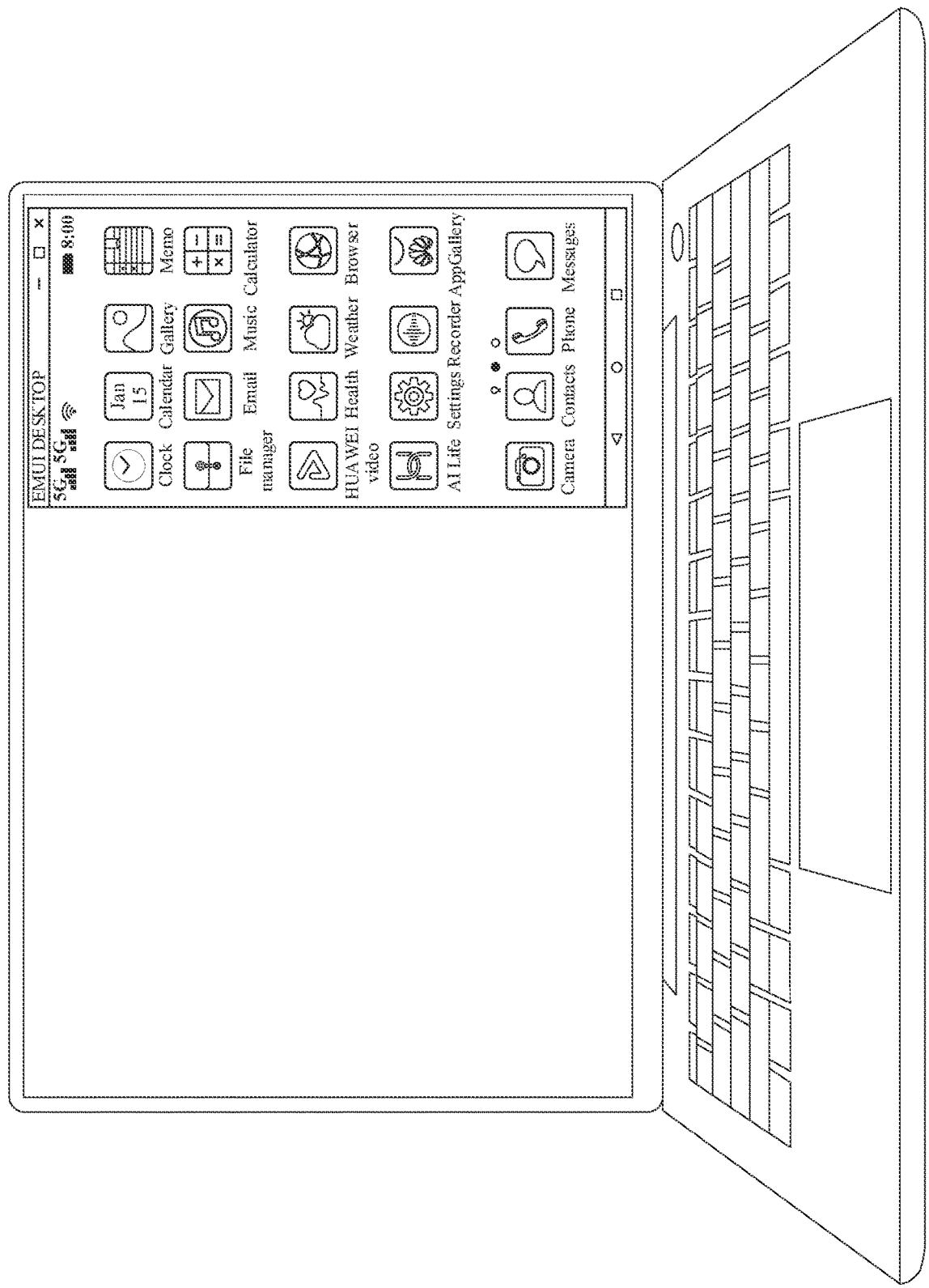
FIG. 2A and FIG. 2B show a schematic diagram of an application scenario of a projection reverse control method according to an embodiment of this application.
Figure 2B:
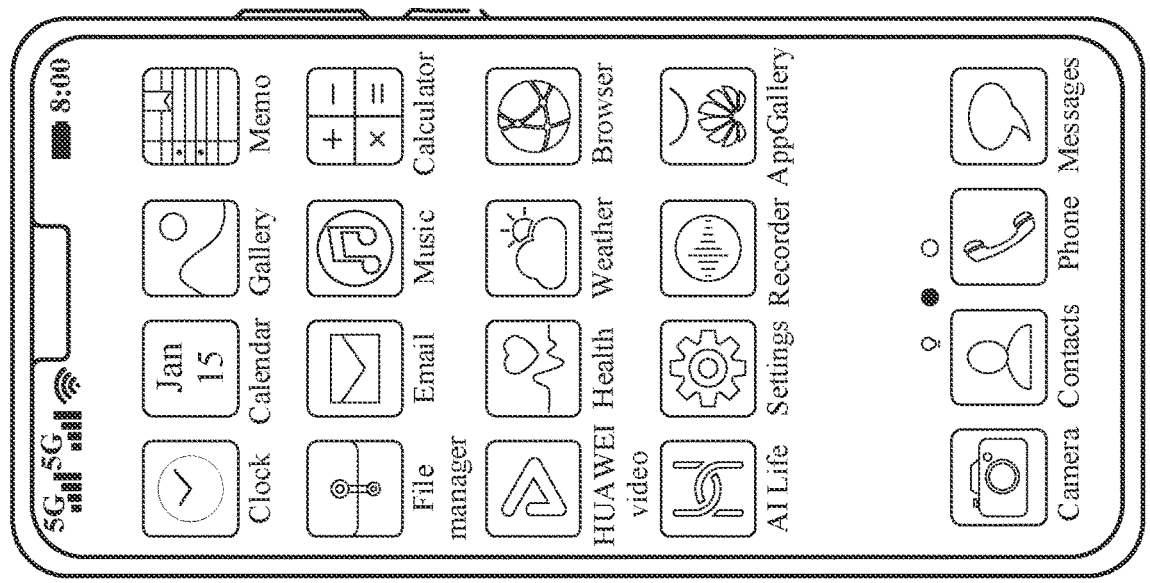

To solve the foregoing problem, an embodiment of this application provides a projection reverse control method. The method may be applied to a scenario in which the first electronic device is projected to the second electronic device. For example, the first electronic device is a mobile phone, and the second electronic device is a computer. FIG. 2A and FIG. 2B show a schematic diagram of an application scenario of the projection reverse control method according to an embodiment of this application. As shown in FIG. 2A and FIG. 2B, the mobile phone may be projected to the computer, to project a display picture of the mobile phone (for example, a mobile phone desktop (or referred to as a home screen) including icons of applications installed on the mobile phone) to a display interface of the computer. The user can control and operate the mobile phone through reverse control on the computer. For example, the user may click, on the computer, an icon of a specific application on the mobile phone desktop that is projected, to perform reverse control on the mobile phone to open the corresponding application.

The projection reverse control method may include: In a case in which the first electronic device is projected to the second electronic device, when receiving a user operation, a peripheral device of the second electronic device, that is, an accessory (for example, a human interface device (human interface device, HID) like a mouse, a keyboard, a stylus, or a game handle, or a user-defined device), may directly send an instruction and data that correspond to the user operation to the first electronic device. To be specific, the peripheral device does not need the second electronic device to forward the instruction and the data to the first electronic device. After receiving the instruction sent by the peripheral device, the first electronic device can make a corresponding response to the instruction, and then send, to the second electronic device, a display picture and/or audio obtained after making the response to the instruction, to perform projection.

In the case in which the first electronic device is projected to the second electronic device, connection between the first electronic device and the second electronic device, between the peripheral device and the first electronic device, and between the peripheral device and the second electronic device may be implemented through short-distance communication (for example, a Bluetooth connection or a wireless fidelity (wireless fidelity, Wi-Fi) direct connection), or may be implemented through a wireless local area network. This is not limited herein.

In this way, in the case in which the first electronic device is projected to the second electronic device, when the user performs reverse control on the first electronic device on the second electronic device, the instruction corresponding to the operation performed by the user by using the peripheral device of the second electronic device can be directly sent by the peripheral device to the first electronic device, so that the first electronic device makes the corresponding response based on the user operation. Therefore, the second electronic device does not need to first receive and process the instruction sent by the peripheral device of the second electronic device and then transmit the instruction to the first electronic device. This simplifies a path for control instruction transmission during reverse control performed by the user on the first electronic device by using the peripheral device of the second electronic device, further improves a reverse control latency in a projection state, quickens a response of a projected electronic device (that is, the first electronic device) to the user operation, and improves hand-following performance, relative to the user operation of the projection picture displayed by an electronic device to which the projected electronic device is projected (that is, the second electronic device).

The following describes the projection reverse control method provided in embodiments of this application with reference to accompanying drawings.

In an embodiment of this application, the first electronic device and the second electronic device each may be a mobile phone, a tablet computer, a handheld computer, a PC, a cellular phone, a personal digital assistant (personal digital assistant, PDA), a wearable device (for example, a smartwatch or a smart band), a smart home device (for example, a television), an in-vehicle infotainment (for example, an in-vehicle computer), a smart screen, a game console, a smart projector, a smart television box, an augmented reality (augmented reality, AR)/virtual reality (virtual reality, VR) device, or the like. A specific device form of the electronic device is not specifically limited in embodiments of this application.

Optionally, in some implementations, device forms of the first electronic device and the second electronic device may be the same. For example, both the first electronic device and the second electronic device are mobile phones.

Alternatively, in some other implementations, device forms of the first electronic device and the second electronic device may be different. For example, the first electronic device is a mobile phone, and the second electronic device is a smart screen. Alternatively, the first electronic device is a mobile phone, and the second electronic device is a computer.

Figure 3:
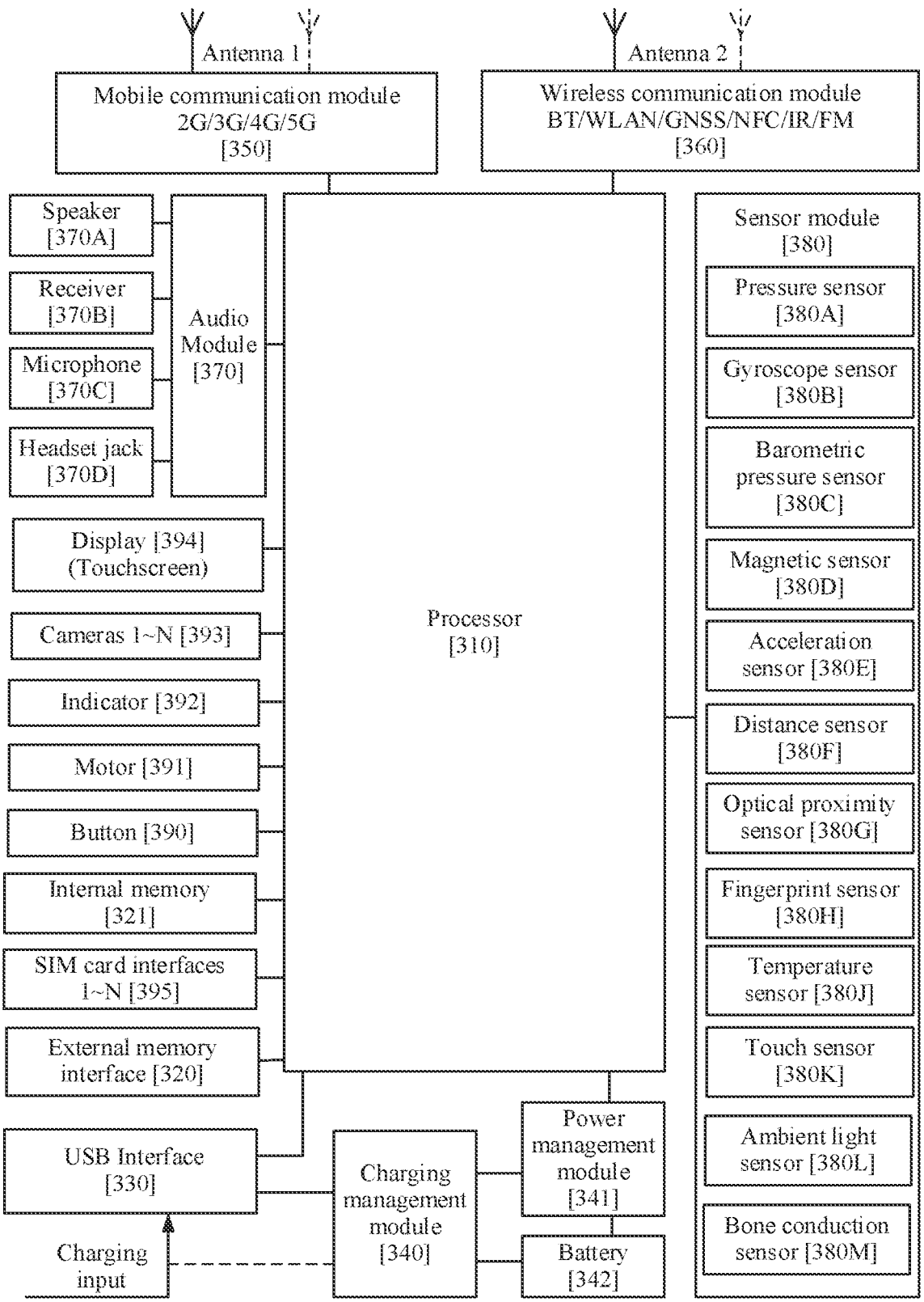
FIG. 3 is a schematic diagram of a structure of an electronic device according to an embodiment of this application.

For example, the electronic device (for example, the first electronic device and the second electronic device) is a mobile phone. FIG. 3 is a schematic diagram of a structure of the electronic device according to an embodiment of this application. To be specific, for example, the electronic device shown in FIG. 3 may be a mobile phone.

As shown in FIG. 3, the electronic device may include a processor 310, an external memory interface 320, an internal memory 321, a universal serial bus (universal serial bus, USB) interface 330, a charging management module 340, a power management module 341, a battery 342, an antenna 1, an antenna 2, a mobile communication module 350, a wireless communication module 360, an audio module 370, a speaker 370A, a receiver 370B, a microphone 370C, a headset jack 370D, a sensor module 380, a button 390, a motor 391, an indicator 392, a camera 393, a display 394, a subscriber identity module (subscriber identity module, SIM) card interface 395, and the like. The sensor module 380 may include a pressure sensor 380A, a gyroscope sensor 380B, a barometric pressure sensor 380C, a magnetic sensor 380D, an acceleration sensor 380E, a distance sensor 380F, an optical proximity sensor 380G, a fingerprint sensor 380H, a temperature sensor 380J, a touch sensor 380K, an ambient light sensor 380L, a bone conduction sensor 380M, and the like.

It may be understood that the structure shown in this embodiment does not constitute a specific limitation on the electronic device. In some other embodiments, the electronic device may include more or fewer components than those shown in the figure, some components may be combined, some components may be split, or a different component arrangement may be used. The components shown in the figure may be implemented by hardware, software, or a combination of software and hardware.

The processor 310 may include one or more processing units. For example, the processor 310 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate devices, or may be integrated into one or more processors.

The controller may be a nerve center and a command center of the electronic device. The controller may generate an operation control signal based on an instruction operation code and a timing signal, to implement control on instruction fetching and execution.

The memory may be further disposed in the processor 310, and is configured to store instructions and data. In some embodiments, the memory in the processor 310 is a cache. The memory may store instructions or data just used or cyclically used by the processor 310. If the processor 310 needs to use the instructions or the data again, the processor 310 may directly invoke the instructions or the data from the memory. This avoids repeated access, reduces waiting time of the processor 310, and improves system efficiency.

In some embodiments, the processor 310 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The charging management module 340 is configured to receive a charging input from a charger. The charger may be a wireless charger or a wired charger. In some embodiments of wired charging, the charging management module 340 may receive a charging input from a wired charger through the USB interface 330. In some embodiments of wireless charging, the charging management module 340 may receive a wireless charging input through a wireless charging coil of the electronic device. The charging management module 340 may further supply power to the electronic device through the power management module 341 while charging the battery 342.

The power management module 341 is configured to connect the battery 342, the charging management module 340, and the processor 310. The power management module 341 receives an input of the battery 342 and/or the charging management module 340, and supplies power to the processor 310, the internal memory 321, an external memory, the display 394, the camera 393, the wireless communication module 360, and the like. The power management module 341 may be further configured to monitor parameters such as a battery capacity, a battery cycle quantity, and a battery health status (leakage and impedance). In some other embodiments, the power management module 341 may alternatively be disposed in the processor 310. In some other embodiments, the power management module 341 and the charging management module 340 may alternatively be disposed in a same device.

A wireless communication function of the electronic device may be implemented through the antenna 1, the antenna 2, the mobile communication module 350, the wireless communication module 360, the modem processor, the baseband processor, and the like.

The antenna 1 and the antenna 2 are configured to transmit and receive an electromagnetic wave signal. Each antenna in the electronic device may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communication module 350 may provide a solution, applied to the electronic device, to wireless communication including 2G, 3G, 4G, 5G, and the like. The mobile communication module 350 may include at least one filter, a switch, a power amplifier, a low noise amplifier (low noise amplifier, LNA), and the like. The mobile communication module 350 may receive an electromagnetic wave through the antenna 1, perform processing such as filtering and amplification on the received electromagnetic wave, and transmit a processed electromagnetic wave to the modem processor for demodulation. The mobile communication module 350 may further amplify a signal modulated by the modem processor, and convert the signal into an electromagnetic wave through the antenna 1 for radiation. In some embodiments, at least some function modules of the mobile communication module 350 may be disposed in the processor 310. In some embodiments, at least some function modules of the mobile communication module 350 may be disposed in a same device as at least some modules of the processor 310.

The wireless communication module 360 may provide a solution, applied to the electronic device, to wireless communication including a wireless local area network (wireless local area network, WLAN) (for example, a wireless fidelity (wireless fidelity, Wi-Fi) network), Bluetooth (bluetooth, BT), a global navigation satellite system (global navigation satellite system. GNSS), frequency modulation (frequency modulation, FM), a near field communication (near field communication, NFC) technology, an infrared (infrared, IR) technology, and the like. The wireless communication module 360 may be one or more devices integrating at least one communication processing module. The wireless communication module 360 receives an electromagnetic wave through the antenna 2, performs frequency modulation and filtering processing on the electromagnetic wave signal, and sends a processed signal to the processor 310. The wireless communication module 360 may further receive a to-be-sent signal from the processor 310, perform frequency modulation and amplification on the signal, and convert the signal into an electromagnetic wave through the antenna 2 for radiation.

In some embodiments, in the electronic device, the antenna 1 and the mobile communication module 350 are coupled, and the antenna 2 and the wireless communication module 360 are coupled, so that the electronic device may communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access. WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system. BDS), a quasi-zenith satellite system (quasi-zenith satellite system, QZSS), and/or a satellite based augmentation system (satellite based augmentation system, SBAS).

The electronic device implements a display function through the GPU, the display 394, the application processor, and the like. The GPU is a microprocessor for image processing, and is connected to the display 394 and the application processor. The GPU is configured to perform mathematical and geometric computation for graphic rendering. The processor 310 may include one or more GPUs that execute program instructions to generate or change display information.

The display 394 is configured to display an image, a video, and the like. The display 394 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode. FLED), a mini-LED, a micro-LED, a micro-OLED, a quantum dot light-emitting diode (quantum dot light-emitting diode, QLED), or the like. In some embodiments, the electronic device may include one or N displays 394, where N is a positive integer greater than 1.

The electronic device may implement a shooting function through the ISP, the camera 393, the video codec, the GPU, the display 394, the application processor, and the like.

The ISP is configured to process data fed back by the camera 393. For example, during photographing, a shutter is opened, and light is transmitted to a photosensitive element of the camera through a lens. An optical signal is converted into an electrical signal. The photosensitive element of the camera transmits the electrical signal to the ISP for processing, to convert the electrical signal into a visible image. The ISP may further perform algorithm optimization on image noise, brightness, and a skin tone. The ISP may further optimize parameters such as exposure and a color temperature in a shooting scenario. In some embodiments, the ISP may be disposed in the camera 393.

The camera 393 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor. CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, an RGB format or a YUV format. In some embodiments, the electronic device may include one or N cameras 393, where N is a positive integer greater than 1.

The digital signal processor is configured to process a digital signal, and may process another digital signal in addition to the digital image signal. For example, when the electronic device selects a frequency, the digital signal processor is configured to perform Fourier transform on frequency energy.

The video codec is configured to compress or decompress a digital video. The electronic device may support one or more types of video codecs. In this way, the electronic device may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, simulates a biological neural network structure like a transmission mode between neurons in a human brain to perform rapid process on input information, and may further perform continuous self-learning. The NPU may implement applications such as intelligent cognition of the electronic device, for example, image recognition, facial recognition, speech recognition, and text understanding.

The internal memory 321 may be configured to store computer-executable program code. The executable program code includes instructions. The processor 310 performs various function applications and data processing of the electronic device by running the instructions stored in the internal memory 321. The internal memory 321 may include a program storage region and a data storage region. The program storage region may store an operating system, an application required for at least one function (for example, a sound play function and an image play function), and the like. The data storage region may store data (for example, audio data and a phonebook) created in a process of using the electronic device, and the like. In addition, the internal memory 321 may include a high-speed random access memory, and may further include a non-volatile memory, for example, at least one magnetic disk storage device, a flash memory device, and a universal flash storage (universal flash storage, UFS).

Certainly, it may be understood that FIG. 3 is merely an example for description when the form of the electronic device is a mobile phone. If the electronic device is in another device form like a tablet computer, a handheld computer, a PC, a PDA, a wearable device (for example, a smartwatch or a smart band), a smart home device (for example, a television), an in-vehicle infotainment (for example, an in-vehicle computer), a smart screen, a game console, or an AR/VR device, a structure of the electronic device may include fewer structures than those shown in FIG. 3, or may include more structures than those shown in FIG. 3. This is not limited herein.

All methods in the following embodiments may be implemented in the electronic device of the foregoing hardware structure.

Figure 4:
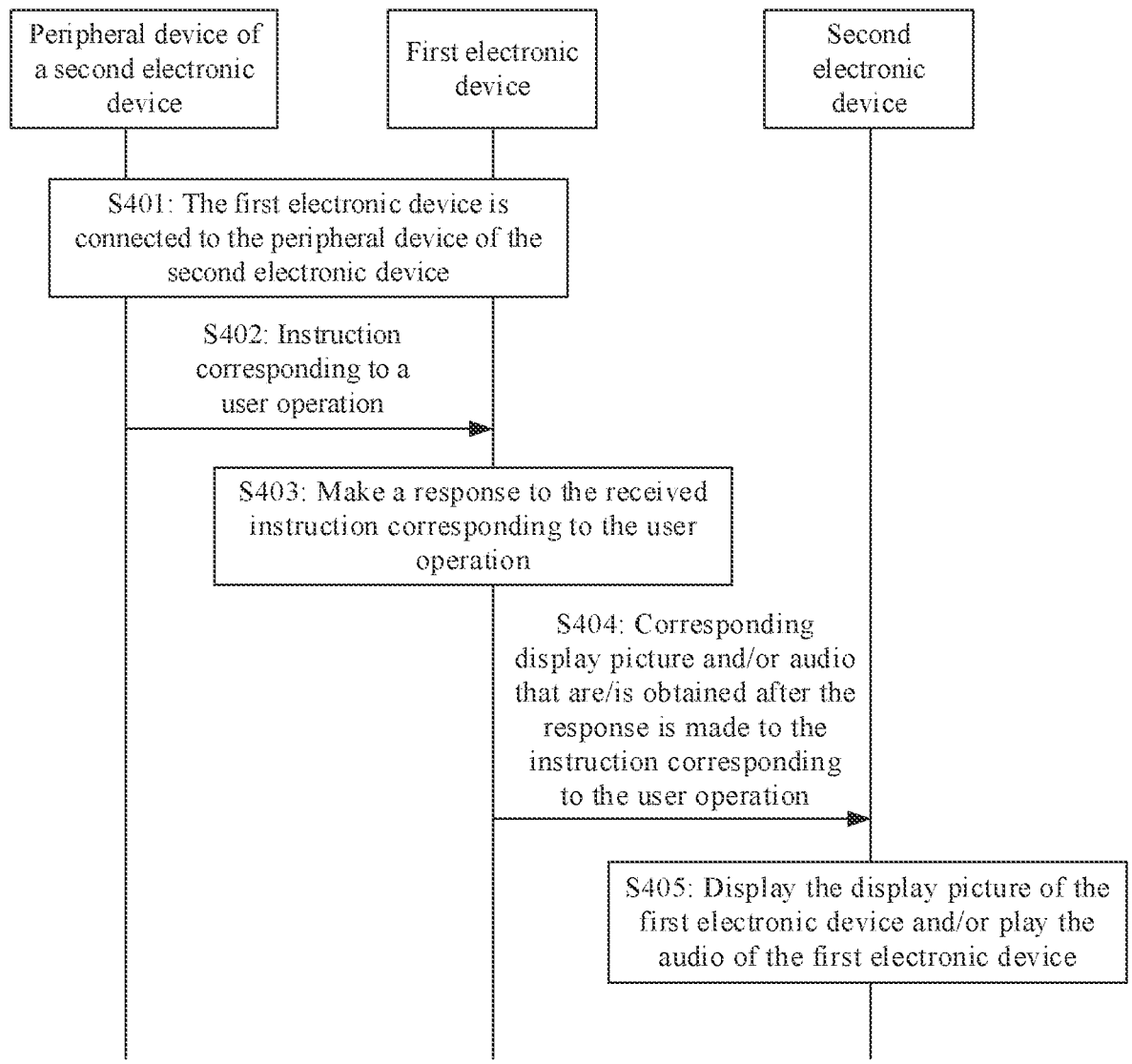
FIG. 4 is a schematic flowchart of a projection reverse control method according to an embodiment of this application.

An example in which the first electronic device is projected to the second electronic device and the user performs reverse control on the first electronic device on the second electronic device is used. FIG. 4 is a schematic flowchart of the projection reverse control method according to an embodiment of this application. As shown in FIG. 4, the method may include the following S401 to S404.

S401: In a case in which the first electronic device is projected to the second electronic device, the first electronic device is connected to the peripheral device of the second electronic device.

Before the first electronic device is projected to the second electronic device, the first electronic device and the second electronic device need to establish a connection. In a process of establishing the connection between the first electronic device and the second electronic device, the first electronic device and the second electronic device negotiate a related parameter of a real-time negotiation protocol, for example, a real-time streaming protocol (real-time streaming protocol, RTSP), to perform, after parameter negotiation, a process in which the first electronic device sends an audio and video stream to the second electronic device based on a negotiation result, so that the second electronic device displays a display picture of the first electronic device (that is, the second electronic device displays a projection picture of the first electronic device) and plays a sound of the first electronic device. In addition, the second electronic device and the first electronic device can determine, through negotiation, a specific location of the display picture of the first electronic device on a display interface of the second electronic device during non-full-screen projection (that is, the second electronic device displays the display picture (that is, the projection picture) of the first electronic device in non-full screen) (generally, after projection, the second electronic device may further synchronize, to the first electronic device, a canvas of the display interface of the second electronic device and a corresponding location (or location information) of a window of the display picture (or the projection picture) of the first electronic device on the canvas of the second electronic device (or a display of the second electronic device)).

Figure 5A:
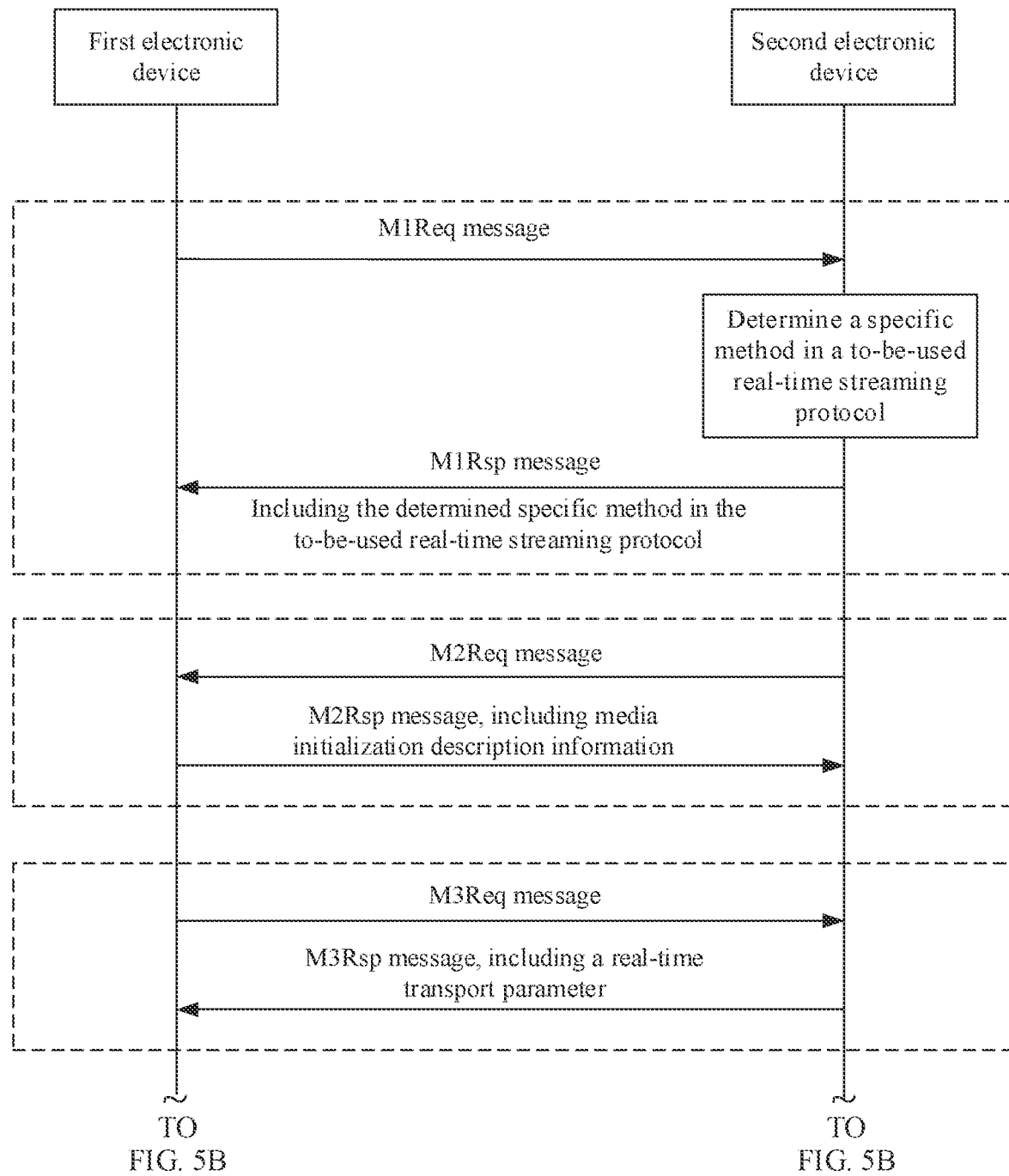
FIG. 5A and FIG. 5B show a schematic flowchart of negotiating a related parameter of a real-time transport protocol according to an embodiment of this application.
Figure 5B:
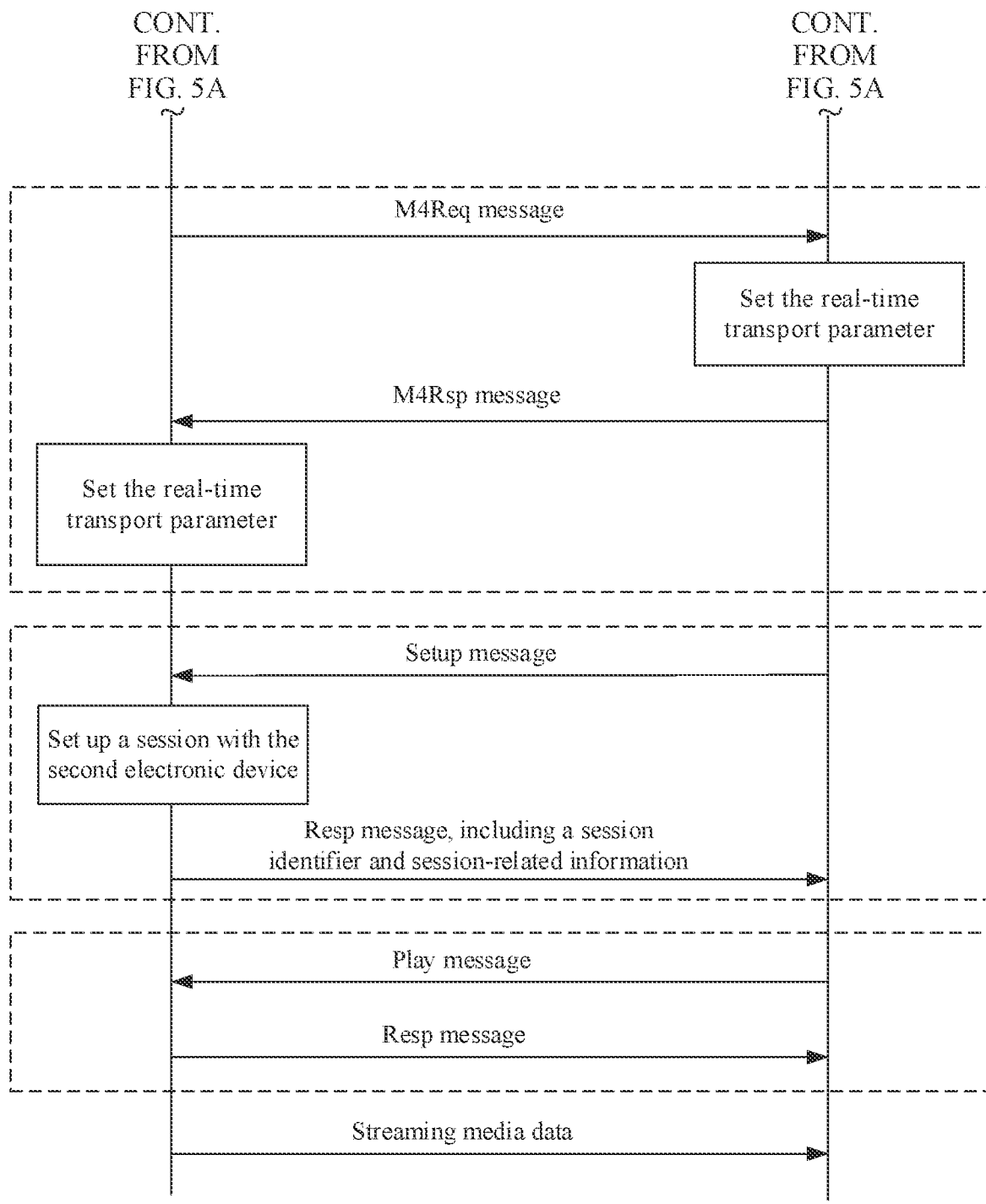

For example, as shown in FIG. 5A and FIG. 5B, a process in which the first electronic device and the second electronic device negotiate the related parameter of the real-time transport protocol may include: The first electronic device sends a real-time streaming protocol option request message (that is, an M1Req message) to the second electronic device. After receiving the M1Req message, the second electronic device may determine a specific method in a to-be-used real-time streaming protocol. Correspondingly, the second electronic device returns a real-time streaming protocol option response message (that is, an M1Rsp message) to the first electronic device, where the message may include the determined specific method in the real-time streaming protocol. With the real-time streaming protocol option request message and the real-time streaming protocol option response message, the first electronic device and the second electronic device can negotiate and determine the specific method in the to-be-used real-time streaming protocol. Then, the second electronic device may send a media initialization description information request message (that is, an M2Req message) to the first electronic device. After receiving the M2Req message, the first electronic device may return a media initialization description information response message (that is, an M2Rsp message) to the second electronic device, where the message may include media initialization description information. With the media initialization description information request message and the media initialization description information response message, the first electronic device and the second electronic device can negotiate and determine respective media capabilities of the first electronic device and the second electronic device. Then, the first electronic device may send a real-time transport parameter request message (that is, an M3Req message) to the second electronic device. Correspondingly, after receiving the M3Req message, the second electronic device may return a real-time transport parameter response message (that is, an M3Rsp message) to the first electronic device, where the message may include a real-time transport parameter. With the real-time transport parameter request message and the real-time transport parameter response message, the first electronic device and the second electronic device can negotiate to obtain the parameters required by the first electronic device and the second electronic device to perform real-time transport. Then, the first electronic device may send a parameter setting request message (that is, an M4Req message) to the second electronic device. After receiving the M4Req message, the second electronic device may set the real-time transport parameter. Then, the second electronic device may return a parameter setting response message (that is, an M4Rsp message) to the first electronic device. After receiving the M4Rsp message, the first electronic device may set the real-time transport parameter. By using the parameter setting request message and the parameter setting response message, the first electronic device and the second electronic device can respectively set the corresponding parameters required for real-time transport. After the first electronic device and the second electronic device set the parameter, the second electronic device may send a session setup request message (that is, a Setup message) to the first electronic device. Correspondingly, the first electronic device sets up a session with the second electronic device based on the session setup request message, and then may return a session setup response message (that is, a Resp message) to the second electronic device. The session setup response message may include a session identifier, session-related information, and the like. After the session is set up between the first electronic device and the second electronic device, the second electronic device may send a streaming media data (for example, the audio and video stream displayed and played by the first electronic device) request message (that is, a Play message) to the first electronic device Correspondingly, the first electronic device may return a response message (that is, a Resp message) to the second electronic device to notify the second electronic device that streaming media data is to be sent. Then, the first electronic device may send the streaming media data to the second electronic device, to perform projection from the first electronic device to the second electronic device.

In some possible implementations, in the case in which the first electronic device is projected to the second electronic device, the second electronic device may send connection information of the peripheral device connected to the second electronic device (for example, a physical address and a token (Token) of the peripheral device) to the first electronic device, so that the first electronic device can be connected to the peripheral device based on the connection information of the peripheral device connected to the second electronic device. The token may be determined through negotiation when the peripheral device is connected to the second electronic device. For example, the first electronic device may be connected to the peripheral device based on the received physical address of the peripheral device. During connection, the peripheral device performs connection verification by using the token. For example, a verification process is as follows: The first electronic device sends a random number to the peripheral device. Then, the first electronic device and the peripheral device verify whether the random number is consistent with a derived token generated by the token. If the random number is consistent with the derived token, the peripheral device is connected to the first electronic device.

In an example, that the second electronic device sends the connection information of the peripheral device connected to the second electronic device to the first electronic device may be as follows: In the foregoing process of negotiating the related parameter of the real-time transport protocol shown in FIG. 5A and FIG. 5B, the second electronic device adds the connection information of the peripheral device connected to the second electronic device to the real-time transport parameter response message (that is, the M3Rsp message) returned by the second electronic device to the first electronic device.

In some other possible implementations, that the second electronic device sends the connection information of the peripheral device connected to the second electronic device to the first electronic device may alternatively be as follows: Before the first electronic device is projected to the second electronic device, if a same account logs in to the first electronic device and the second electronic device, or a trusted connection is established between the first electronic device and the second electronic device (for example, the first electronic device establishes a binding relationship with the second electronic device), the second electronic device may synchronize device information of the peripheral device connected to the second electronic device to the first electronic device, so that the first electronic device can be connected to the peripheral device of the second electronic device based on the device information when the first electronic device is subsequently projected to the second electronic device.

It should be noted that connections between the peripheral device and the first electronic device and between the peripheral device and the second electronic device may be Bluetooth connections, Wi-Fi Direct connections, or the like. This is not limited herein.

When the user performs reverse control on the first electronic device on the second electronic device by using the peripheral device of the second electronic device, the peripheral device of the second electronic device may send an instruction corresponding to a user operation to the first electronic device. For example, the peripheral device of the second electronic device may perform the following S402.

S402: The peripheral device of the second electronic device receives the user operation, and sends the instruction corresponding to the user operation to the first electronic device.

The user operation may be an operation like sliding, clicking, or typing performed by the user by using the peripheral device. For example, the peripheral device is a mouse, and the user operation is a sliding, clicking, or dragging operation performed by the user by using the mouse. For another example, the peripheral device is a keyboard, and the user operation is a typing operation performed by the user by using the keyboard. The instruction sent by the peripheral device may include information corresponding to a specific user operation (for example, sliding, clicking, typing, or dragging) (for example, movement information of the mouse or a stylus, and typing information of the keyboard or a handle, where the movement information may include a movement distance and a movement direction).

For example, the peripheral device is a mouse, and the user operation is an operation that the user slides the mouse and clicks. When the first electronic device is projected to the second electronic device in non-full screen, the second electronic device may synchronize, to the first electronic device, the canvas of the display interface of the second electronic device, a corresponding location of the display picture of the first electronic device on the canvas of the display interface of the second electronic device, and a location (that is, coordinates) of a mouse cursor on the canvas of the display interface of the second electronic device. When the user moves the mouse for sliding, the mouse may send, to the first electronic device, an instruction including a movement direction and a movement distance of the mouse. The first electronic device may determine, based on the location of the mouse cursor synchronized by the second electronic device on the canvas of the display interface of the second electronic device and with reference to the received movement direction and the movement distance of the mouse, a location of the mouse cursor on the canvas of the display interface of the second electronic device after the user moves the mouse. When the user clicks a mouse button, the mouse may send, to the first electronic device, an instruction including indication information for indicating that the user performs a clicking operation. The first electronic device may determine, based on the indication information in the instruction, that the user performs the clicking operation. When the first electronic device is projected to the second electronic device in full screen, the first electronic device may use the display picture of the first electronic device as the projection picture and mirror the projection picture to the second electronic device in full screen, or draw the projection picture based on a size of the display of the second electronic device and then project the projection picture to the second electronic device in full screen. In this case, a picture displayed by the second electronic device is exactly the picture drawn by the first electronic device. Therefore, the mouse cursor may be drawn by the first electronic device in the projection picture of the first electronic device and projected onto the second electronic device. When the user moves the mouse for sliding, the mouse may send, to the first electronic device, an instruction including a movement direction and a movement distance of the mouse. The first electronic device may determine, based on the received movement direction and the movement distance of the mouse, a location of the mouse cursor after the user moves the mouse. After projection, the first electronic device may first draw the mouse cursor at a preset initial position. For example, after projection, the first electronic device may first display the mouse cursor in an upper left corner of the projection picture, or display the mouse cursor in a center of the projection picture.

For another example, the peripheral device is a keyboard, and the user operation is an operation of typing a character by the user by using the keyboard. When the user types the character by using the keyboard, the keyboard may send, to the first electronic device, an instruction including indication information for indicating the user to type the character. The first electronic device may determine, based on the indication information in the instruction, that the user has typed the corresponding character.

Optionally, when the peripheral device of the second electronic device sends the instruction corresponding to the user operation to the first electronic device, the peripheral device may send the instruction to only the first electronic device, or may send the instruction to both the first electronic device and the second electronic device.

For example, when the first electronic device is projected to the second electronic device, the first electronic device and the second electronic device may negotiate in advance whether projection from the first electronic device to the second electronic device is full-screen projection or non-full-screen projection when performing the negotiation process shown in FIG. 5A and FIG. 5B.

Figure 6A:
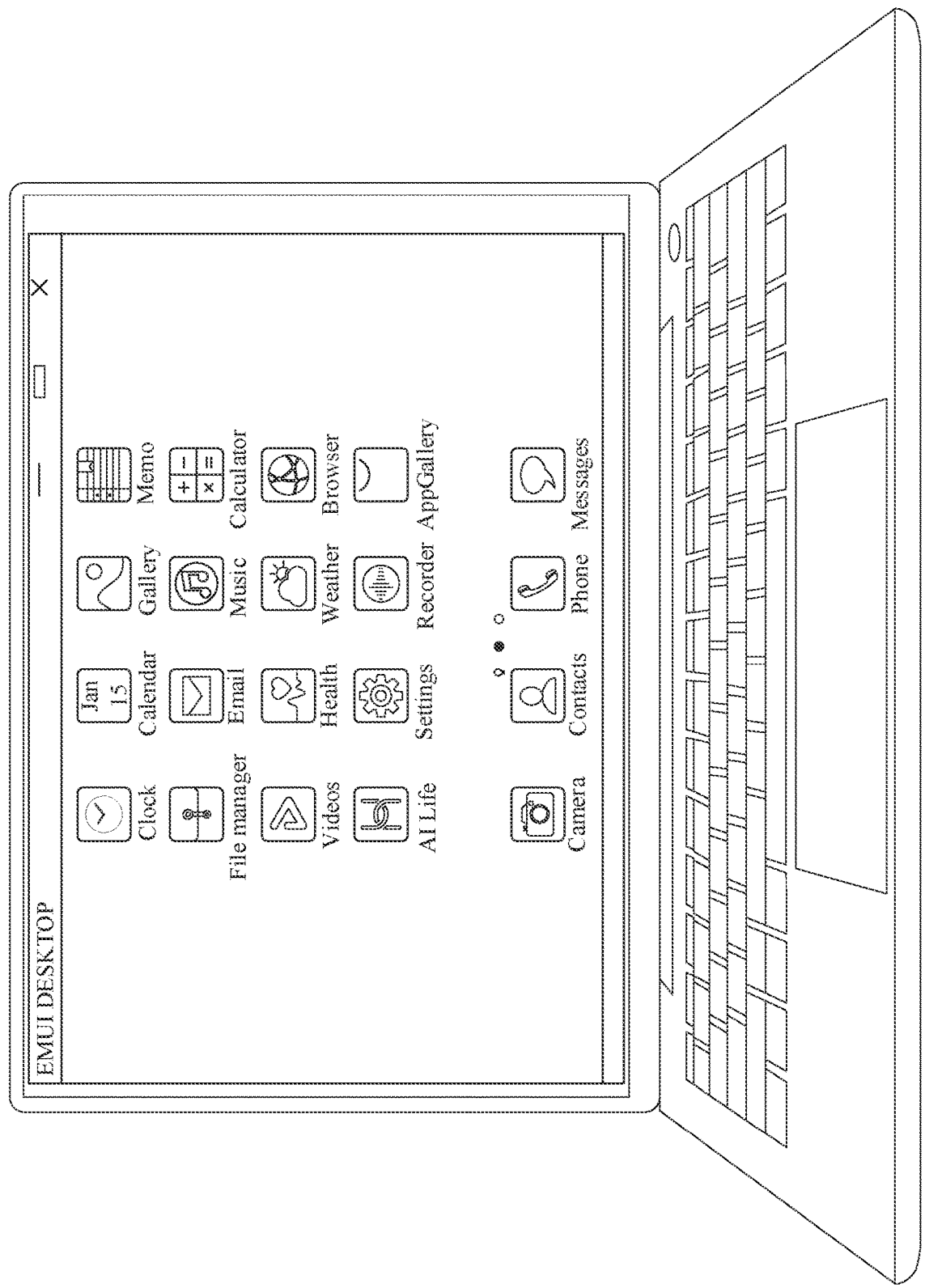
FIG. 6A and FIG. 6B show a schematic diagram of a full-screen projection interface according to an embodiment of this application.
Figure 6B:
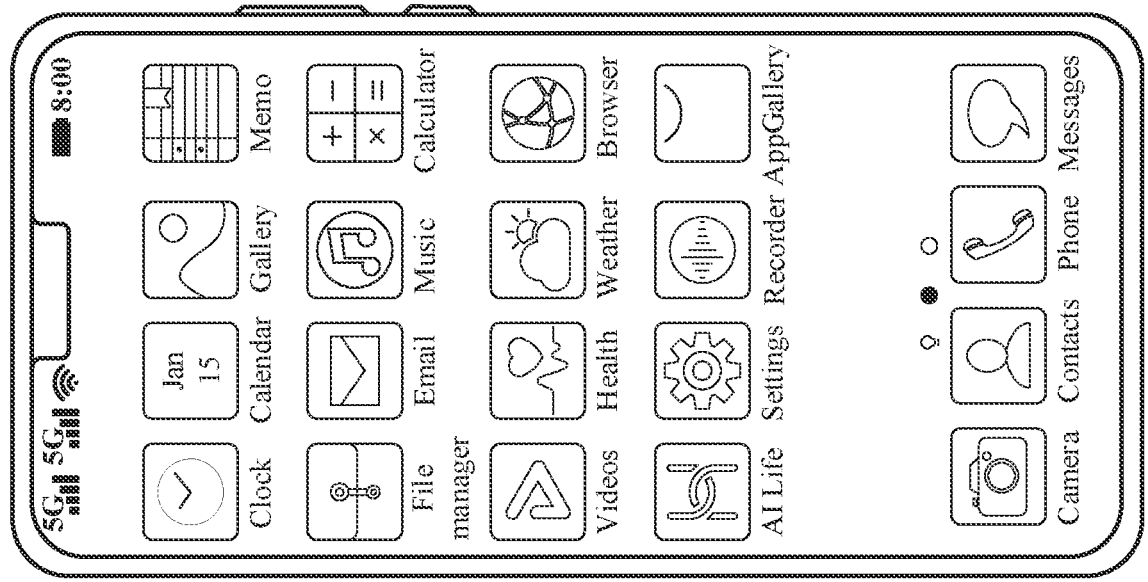
Figure 7A:
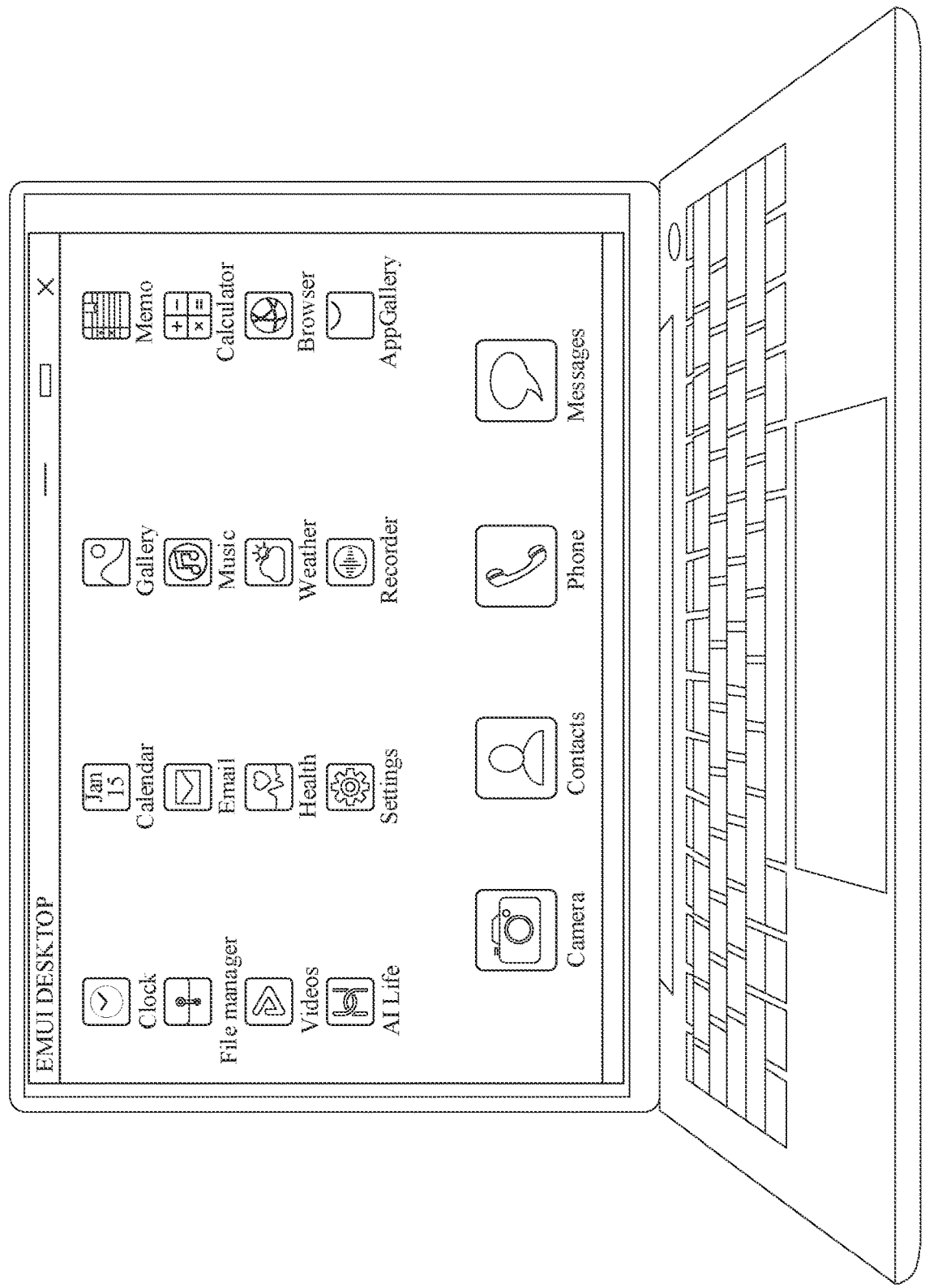
FIG. 7A and FIG. 7B show a schematic diagram of another full-screen projection interface according to an embodiment of this application.
Figure 7B:
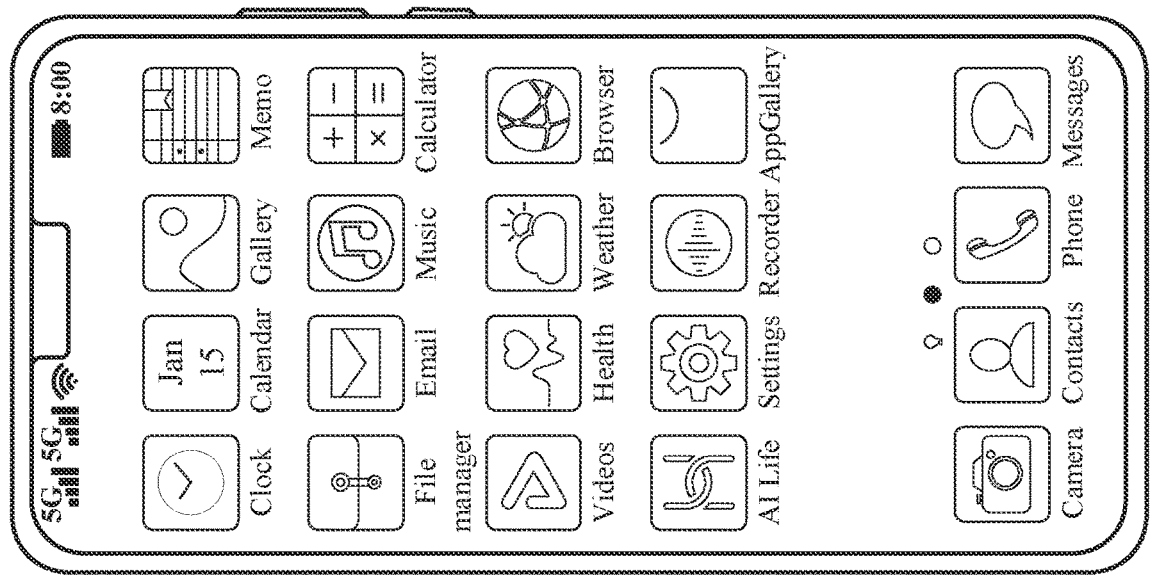

As shown in FIG. 6A and FIG. 6B, projection from the first electronic device (the mobile phone shown in the figure) to the second electronic device (the computer shown in the figure) may be proportionally mirrored full-screen projection from the first electronic device to the second electronic device. Alternatively, as shown in FIG. 7A and FIG. 7B, when the first electronic device (the mobile phone shown in the figure) is projected to the second electronic device (the computer shown in the figure), adaptive full-screen projection may be performed from the first electronic device to the second electronic device based on a size of the display of the second electronic device, so that the projection picture is adapted to the size of the display of the second electronic device. During full-screen projection shown in FIG. 6A and FIG. 6B, or FIG. 7A and FIG. 7B, the second electronic device displays the display picture of the first electronic device in full screen, and does not display a display picture of the second electronic device. When the second electronic device displays in full screen the display picture projected from the first electronic device (that is, the first electronic device projects the display picture to the second electronic device in full screen), the second electronic device does not display the display picture generated by the second electronic device, so that the operation performed by the user by using the peripheral device of the second electronic device is not an operation performed on the second electronic device. Therefore, in this case, the peripheral device of the second electronic device may send the instruction to only the first electronic device (for example, the peripheral device directly belongs to the first electronic device). Alternatively, the peripheral device of the second electronic device sends the instruction corresponding to the user operation to both the first electronic device and the second electronic device, but the second electronic device does not accept or discard the received instruction.

Figure 8A:
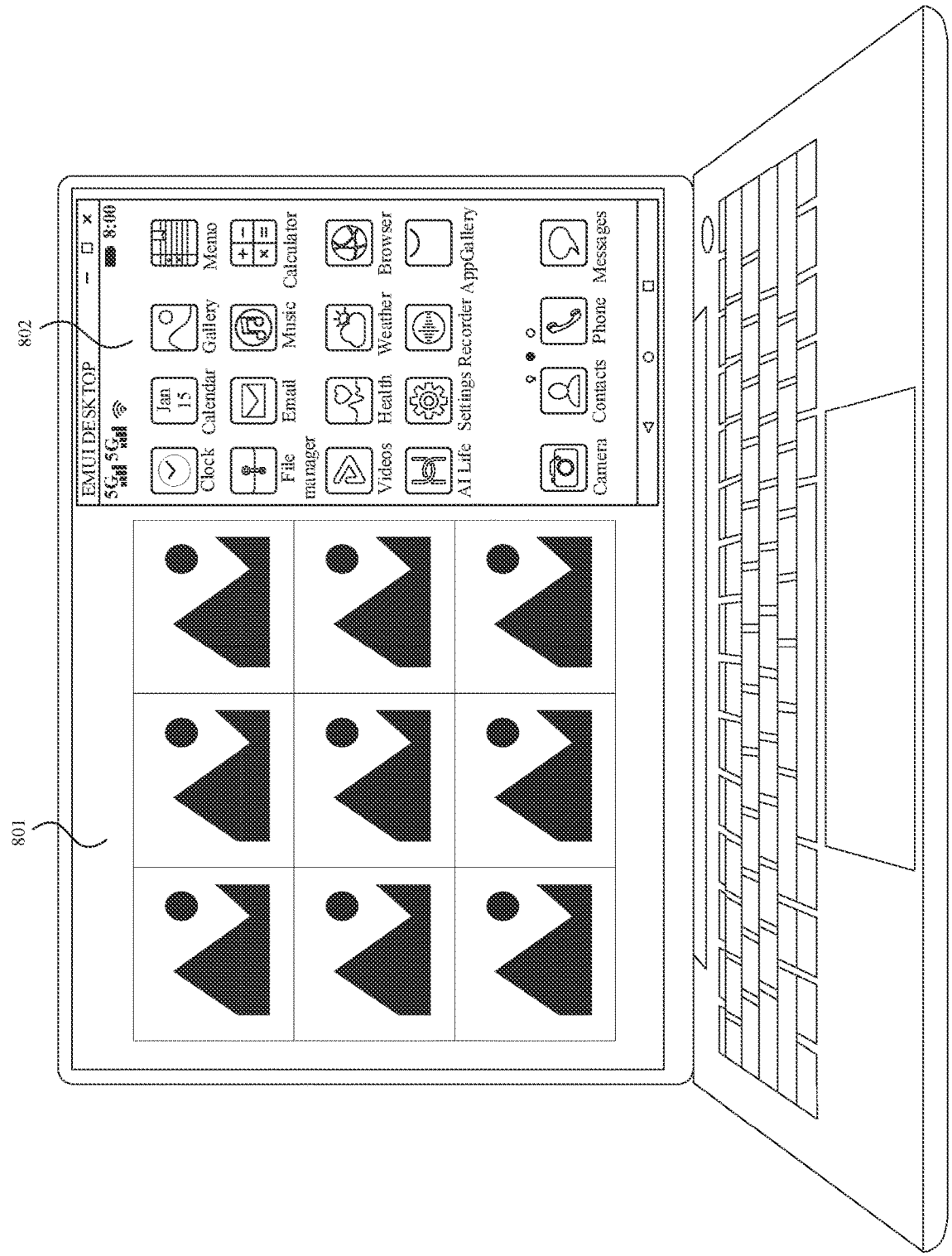
FIG. 8A and FIG. 8B show a schematic diagram of a non-full-screen projection interface according to an embodiment of this application.
Figure 8B:
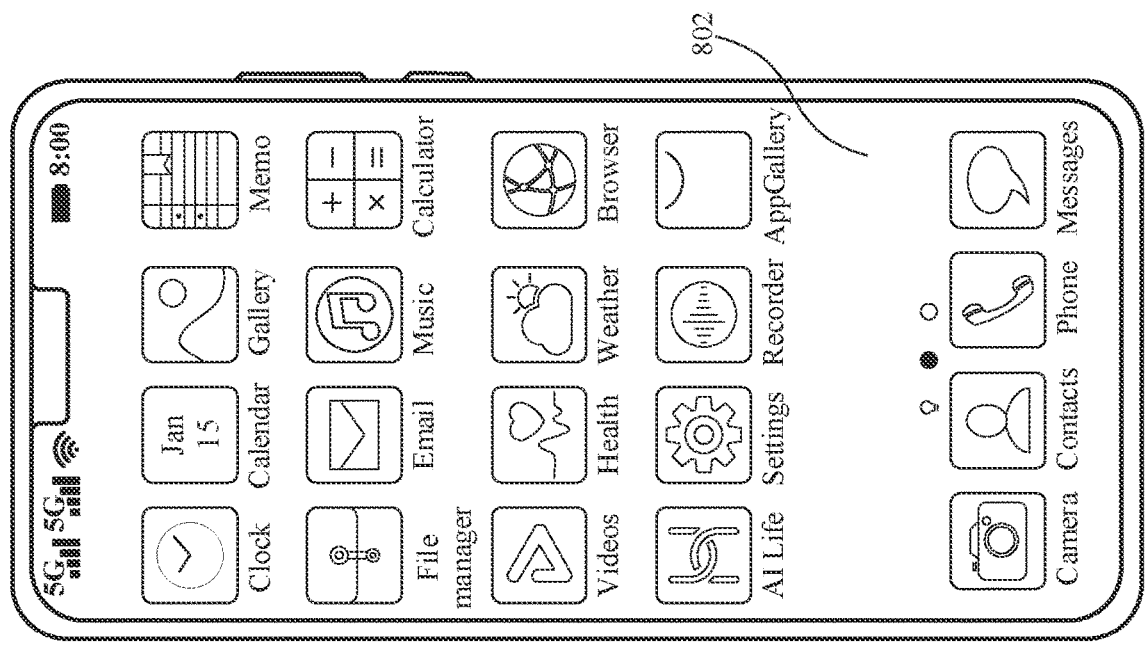

As shown in FIG. 8A and FIG. 8B, projection from the first electronic device (the mobile phone shown in the figure) to the second electronic device (the computer shown in the figure) may be non-full-screen projection from the first electronic device to the second electronic device. In this case, the second electronic device displays both a display picture 801 of the second electronic device and a display picture 802 of the first electronic device. When the second electronic device displays the display picture (that is, the projection picture) projected from the first electronic device in non-full screen (that is, the first electronic device is projected to the second electronic device in non-full screen), the second electronic device further displays the display picture generated by the second electronic device, so that the operation performed by the user by using the peripheral device of the second electronic device may also be an operation performed on the second electronic device. Therefore, in this case, the peripheral device of the second electronic device may send the instruction to both the first electronic device and the second electronic device. In this case, after receiving the instruction, the first electronic device and the second electronic device may determine, based on whether a location of the user operation corresponding to the instruction is in the display pictures of the first electronic device and the second electronic device, whether to respond to the instruction. For example, the peripheral device of the second electronic device is a mouse, and the user performs a clicking operation by using the mouse. After receiving an instruction sent by the mouse, the first electronic device and the second electronic device may determine, according to the instruction, a location at which the user clicks, to determine whether the user operation is an operation performed on the first electronic device or the second electronic device. If the location is in the display picture of the first electronic device, the first electronic device responds according to the instruction: or if the location is in the display picture of the second electronic device, the second electronic device responds according to the instruction. To be specific, when the user moves the mouse and clicks, the first electronic device may determine, based on the movement direction and the movement distance that are sent after the mouse moves, and the location of the mouse cursor on the canvas of the display interface of the second electronic device, the canvas of the display interface of the second electronic device, and the corresponding location of the display picture of the first electronic device on the canvas of the display interface of the second electronic device, which are synchronized by the second electronic device, a location of the mouse cursor on the canvas of the display interface of the second electronic device after the mouse cursor moves, that is, a location of the mouse clicking operation on the display interface of the second electronic device. If the location determined by the first electronic device is in the display picture of the first electronic device, the first electronic device responds to the operation of moving the mouse and clicking. The second electronic device may determine the location of the mouse cursor on the canvas of the display interface of the second electronic device after the mouse cursor moves, that is, the location of the mouse clicking operation on the display interface of the second electronic device. If the location determined by the second electronic device is in the display picture of the second electronic device, the second electronic device responds to the operation of moving the mouse and clicking.

Figure 9A:
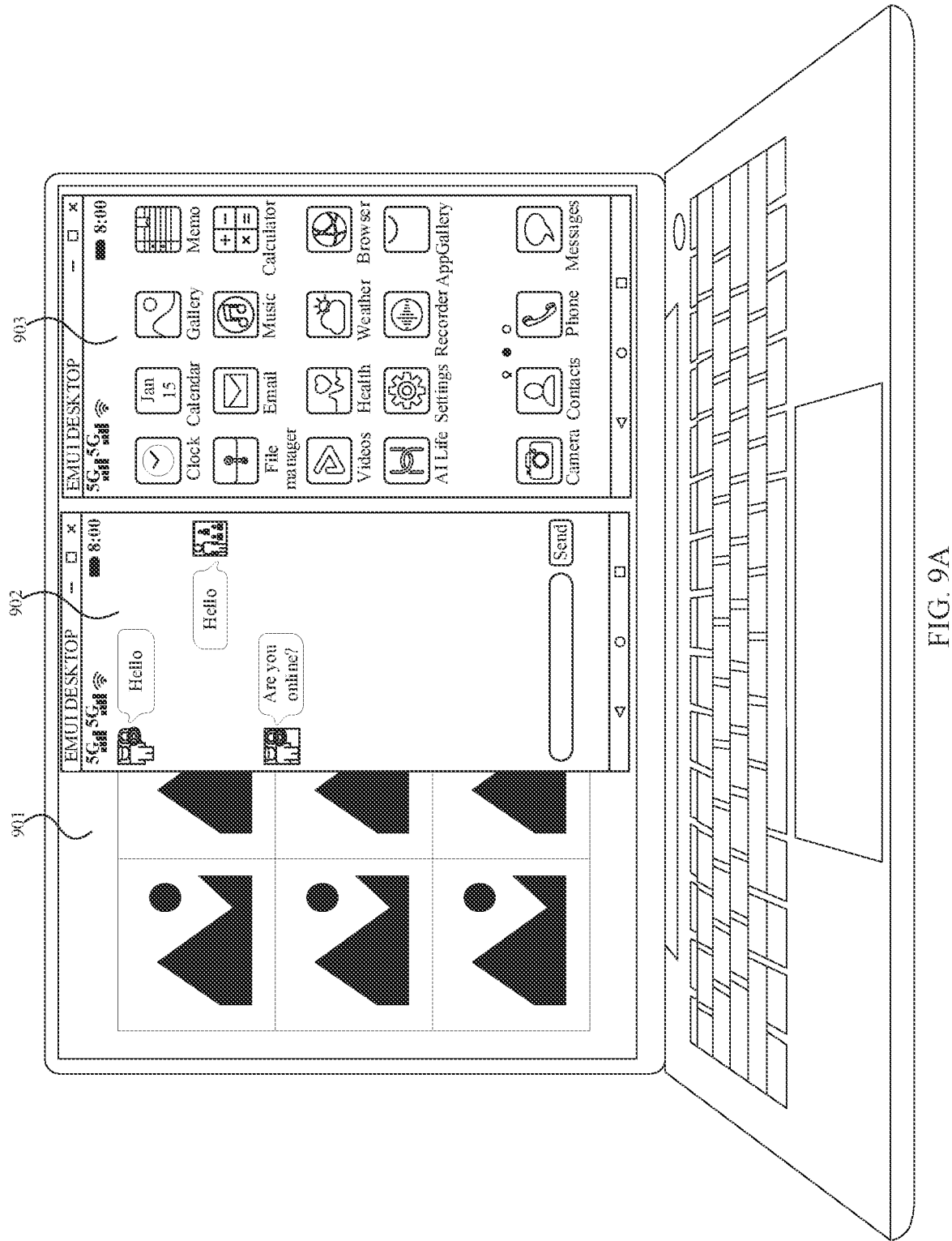
FIG. 9A and FIG. 9B show a schematic diagram of another non-full screen projection interface according to an embodiment of this application.
Figure 9B:
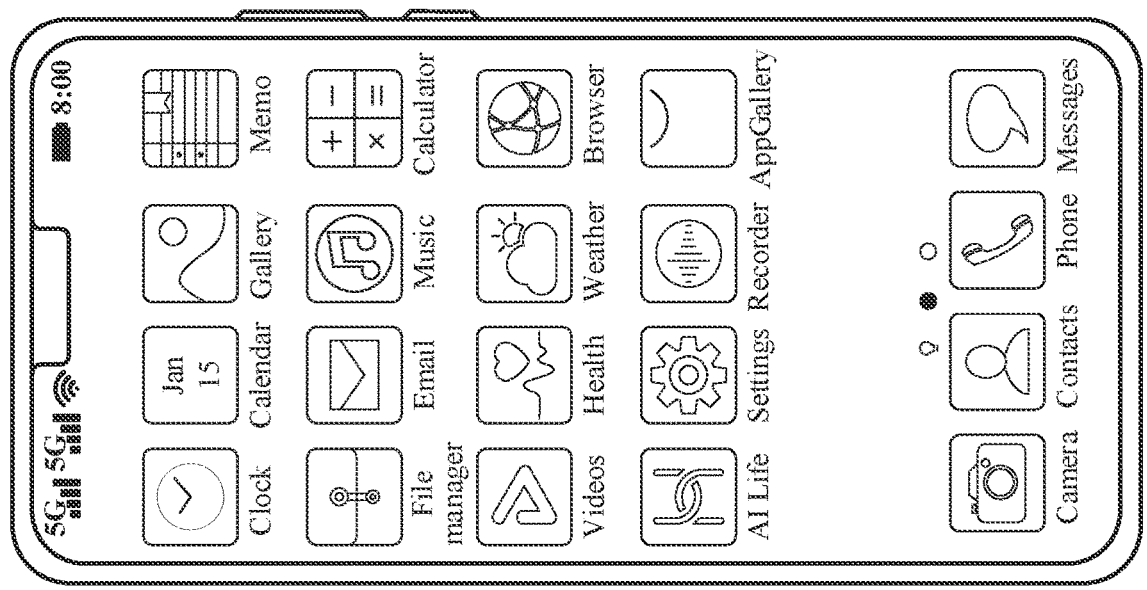

In some possible implementations, in addition to the picture currently displayed by the first electronic device shown in FIG. 8A and FIG. 8B, the display picture of the first electronic device displayed by the second electronic device may be a plurality of window pictures projected from the first electronic device to the second electronic device. For example, as shown in FIG. 9A and FIG. 9B, projection from the first electronic device (the mobile phone shown in the figure) to the second electronic device (the computer shown in the figure) may be multi-window non-full-screen projection from the first electronic device to the second electronic device. In this case, the second electronic device displays both a display picture 901 of the second electronic device and a plurality of window pictures projected from the first electronic device, for example, a window picture 902 of a first application and a window picture 903 of a home screen of the first electronic device. The plurality of window pictures may be sent to the second electronic device after drawn by the first electronic device in background.

S403: The first electronic device makes a response to the received instruction corresponding to the user operation.

The user operation may be tapping, sliding, dragging, typing, or another operation. For example, if the user clicks a specific control in the display picture of the first electronic device, the first electronic device may make a response to clicking on the control according to the received instruction corresponding to the user operation. For another example, if the user drags a specific icon in the display picture of the first electronic device, the first electronic device may make a response to the received instruction corresponding to the user operation, and generate a display picture in which the icon is dragged.

Generally, projection from the first electronic device to the second electronic device may be full-screen projection or non-full-screen projection.

Therefore, in an example, for example, a related example in S402, when full-screen projection is performed from the first electronic device to the second electronic device, the peripheral device of the second electronic device may send the instruction corresponding to the user operation to only the first electronic device. Alternatively, the peripheral device of the second electronic device sends the instruction corresponding to the user operation to both the first electronic device and the second electronic device, but the second electronic device does not accept or discard the received instruction. In this case, after receiving the instruction corresponding to the user operation, the first electronic device may directly make a response to the instruction.

In another example, for example, a related example in S402, when non-full-screen projection is performed from the first electronic device to the second electronic device, the peripheral device of the second electronic device may send the instruction to both the first electronic device and the second electronic device. In this case, when the first electronic device is projected to the second electronic device, the first electronic device and the second electronic device can determine, through negotiation, a specific location of the display picture of the first electronic device on the display interface of the second electronic device. Therefore, after the first electronic device and the second electronic device respectively receive the instruction corresponding to the user operation, the first electronic device may determine whether a location of the user operation (that is, coordinates of the location corresponding to the user operation on the display interface of the second electronic device) is in the display picture of the first electronic device or in the display picture of the second electronic device. If the location of the user operation is in the display picture of the first electronic device, the first electronic device processes the instruction and makes a corresponding response, or if the location of the user operation is not in the display picture of the first electronic device, the first electronic device does not process the instruction. Similarly, the second electronic device may determine whether the location of the user operation (that is, coordinates of the location corresponding to the user operation in the display interface of the second electronic device) is in the display picture of the first electronic device or in the display picture of the second electronic device. If the location of the user operation is in the display picture of the second electronic device, the second electronic device processes the instruction and makes a corresponding response: or if the location of the user operation is not in the display picture of the second electronic device, the second electronic device does not process the instruction.

Optionally, after the first electronic device makes the response to the received instruction corresponding to the user operation, the display picture of the first electronic device may change, the first electronic device may correspondingly play audio, or audio that is being played may change. Therefore, the first electronic device may further send, to the second electronic device, a corresponding display picture and/or audio that are/is obtained after the response is made to the instruction corresponding to the user operation. For example, the first electronic device may perform the following S404.

S404: The first electronic device sends, to the second electronic device, the display picture and/or the audio that are/is obtained after the response is made to the instruction corresponding to the user operation.

For example, a process in which the first electronic device sends the display picture and/or the audio to the second electronic device may be the same as a current transmission process during projection of an electronic device. For example, the display picture and/or the audio of the first electronic device may be encoded by a video codec and/or an audio codec (optionally, the encoded display picture and/or audio may be further compressed and converted into a basic packetized elementary stream (packetized elementary stream. PES) encapsulation format, to reduce a size of data to be subsequently transmitted to the second electronic device). Then, a related parameter of a high-bandwidth digital content protection (high bandwidth digital content protection, HDCP) protocol is added to the encoded display picture and/or audio to encrypt the display picture and/or audio. Then, the display picture and/or the audio are/is merged in a transport stream (MPEG2-TS) manner. Next, a real-time transport protocol (real-time transport protocol, RTP) header is added for final transmission to the second electronic device through a connection (for example, a Wi-Fi direct connection or a Wi-Fi local area network connection) established between the first electronic device and the second electronic device by using a user datagram protocol (user datagram protocol, UDP), a transmission control protocol (transmission control protocol, TCP), or an internet protocol (internet protocol, IP). Correspondingly, the second electronic device may perform decapsulation, MPEG2-TS demultiplexing, HDCP decryption, PES decompression, and decoding on received data according to a reverse process of the foregoing process, for display and/or audio play.

S405. The second electronic device displays the display picture of the first electronic device and/or plays the audio of the first electronic device.

Figure 10:
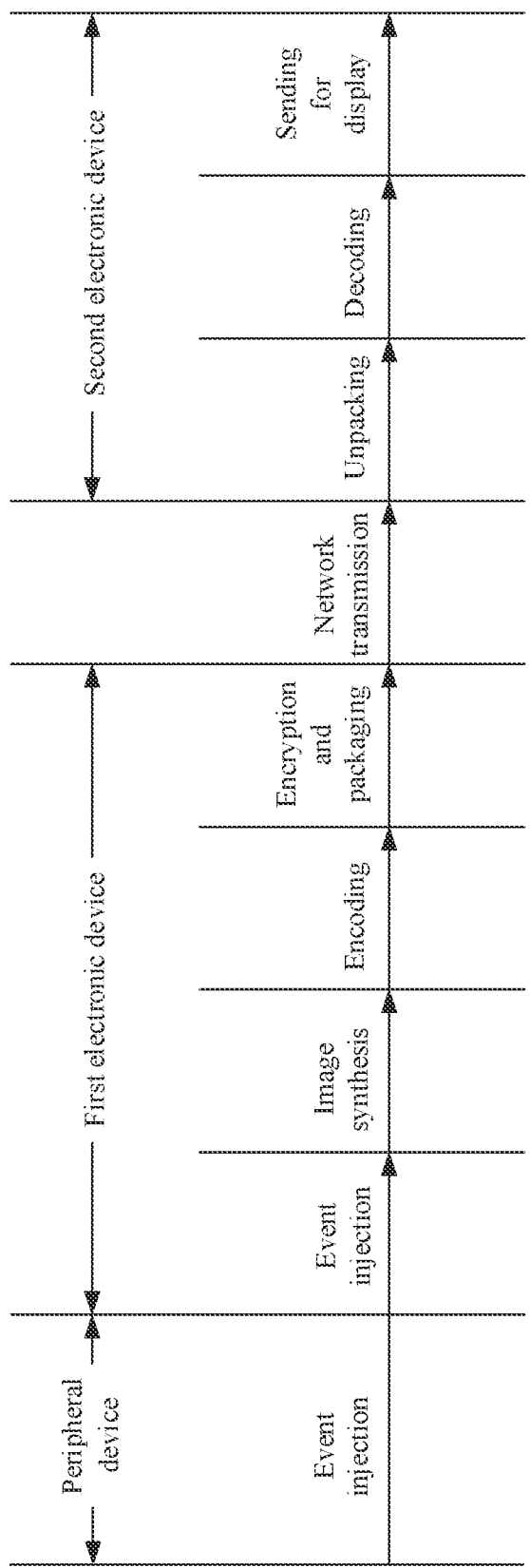
FIG. 10 is a schematic flowchart of an application of a projection reverse control method according to an embodiment of this application.

For example, based on the method shown in FIG. 4, an example in which the first electronic device is a mobile phone, the second electronic device is a computer, and the display picture of the first electronic device changes after reverse control is performed is used. FIG. 10 is a schematic flowchart of an application of the projection reverse control method according to an embodiment of this application. As shown in FIG. 10, a projection reverse control process may include: After receiving a user operation, a peripheral device of the computer sends an instruction corresponding to the user operation to the mobile phone (that is, event injection). Then, the mobile phone may respond according to the received instruction, to perform image synthesis. After completing image synthesis, the mobile phone may perform image encoding, encryption, and packaging on a synthesized image, and then transmit the encrypted and packaged image to the computer through a network (for example, a link formed by connecting the mobile phone to the computer in an end-to-end manner or based on a local area network). After receiving the packaged image transmitted by the mobile phone, the computer may unpack and decode the packaged image, and then send the decoded image to a display module for display (or referred to as sending for display).

With the method in the foregoing embodiments, in the case in which the first electronic device is projected to the second electronic device, when the user performs reverse control on the first electronic device on the second electronic device, an instruction corresponding to an operation performed by the user by using the peripheral device of the second electronic device can be directly sent by the peripheral device of the second electronic device to the first electronic device, so that the first electronic device makes a corresponding response based on the user operation. Therefore, the second electronic device does not need to first receive and process the instruction sent by the peripheral device of the second electronic device and then transmit the instruction to the first electronic device. This simplifies a path for control instruction transmission during reverse control performed by the user on the first electronic device by using the peripheral device of the second electronic device, further improves a reverse control latency in a projection state, quickens a response of a projected electronic device to the user operation, and improves hand-following performance, relative to the user operation, of the projection picture displayed by an electronic device to which the projected electronic device is projected.

The foregoing mainly describes, from a perspective of interaction between the first electronic device and the second electronic device, the solutions provided in embodiments of this application. It may be understood that, to implement the foregoing functions, a person skilled in the art should be easily aware that, with reference to the steps in the examples described in embodiments disclosed in this specification, only the method related to the first electronic device or only the method related to the second electronic device may be implemented. This is not limited in embodiments of this application.

Figure 11:
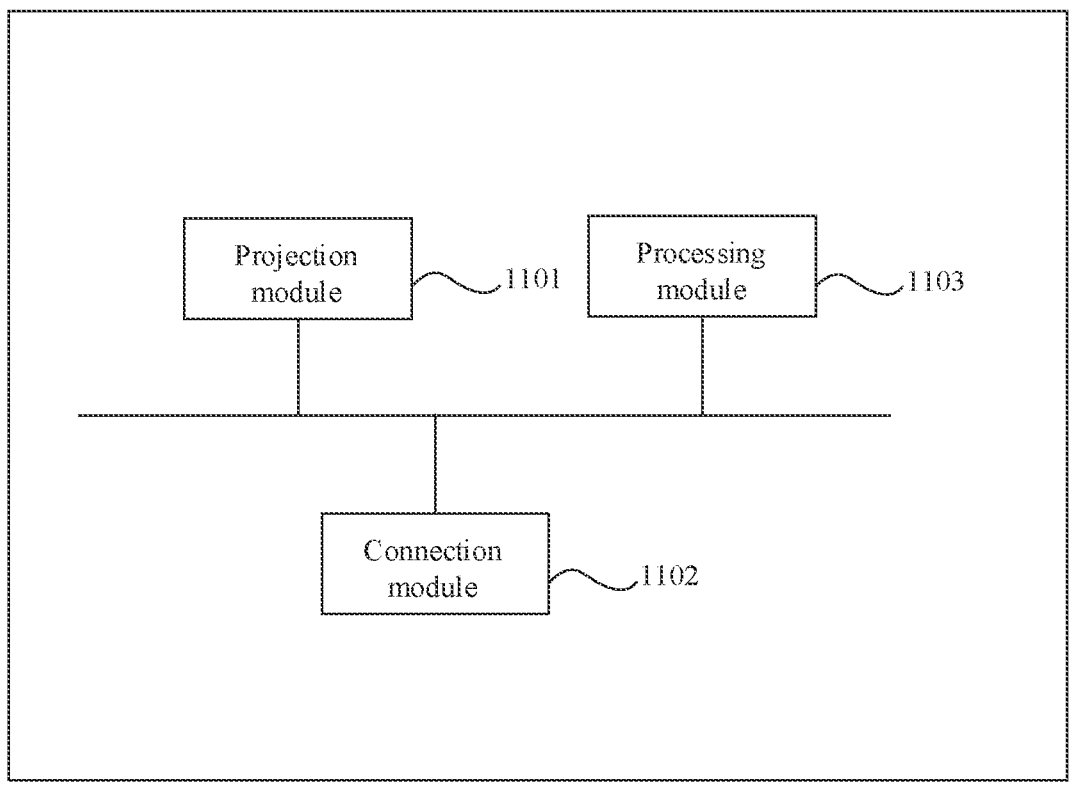
FIG. 11 is a schematic diagram of a structure of a projection reverse control apparatus according to an embodiment of this application.

Corresponding to the method in the foregoing embodiments, an embodiment of this application further provides a projection reverse control apparatus. The apparatus may be used in the first electronic device to implement the method related to the first electronic device in the foregoing embodiments. A function of the apparatus may be implemented by hardware, or may be implemented by corresponding software executed by hardware. The hardware or software includes one or more modules corresponding to the functions. For example, FIG. 1l is a schematic diagram of a structure of the projection reverse control apparatus. As shown in FIG. 11, the apparatus includes a projection module 1101, a connection module 1102, a processing module 1103, and the like. The projection module 1101, the connection module 1102, and the processing module 1103 may be configured to cooperatively implement the method related to the first electronic device in the foregoing embodiments. Optionally, an embodiment of this application further provides a projection reverse control apparatus. The apparatus may be used in the second electronic device to implement the method related to the second electronic device in the foregoing embodiments. A function of the apparatus may be implemented by hardware, or may be implemented by corresponding software executed by hardware. The hardware or software includes one or more modules corresponding to the functions. For example, for a specific structure of the apparatus, refer to the structure of the projection reverse control apparatus shown in FIG. 10.

It should be understood that division of units or modules (referred to as units below) in the foregoing apparatus is merely logical function division. During actual implementation, all or some of the units or modules may be integrated into one physical entity, or may be physically separated. In addition, all the units in the apparatus may be implemented in a form of software invoked by a processing element, or may be implemented in a form of hardware. Alternatively, some units may be implemented in a form of software invoked by a processing element, and some units are implemented in a form of hardware.

For example, each unit may be a processing element that is separately disposed, or may be integrated into a chip of the apparatus for implementation. In addition, each unit may alternatively be stored in a memory in a form of program, and is invoked by a specific processing element of the apparatus to perform a function of the unit. In addition, all or some of the units may be integrated together, or may be implemented independently. The processing element herein may also be referred to as a processor, and may be an integrated circuit with a signal processing capability. In an implementation process, the steps in the method or the units may be implemented by a hardware integrated logical circuit in the processing element, or may be implemented in a form of software invoked by the processing element.

In an example, the units in the apparatus may be one or more integrated circuits configured to implement the foregoing method, for example, one or more ASICs, one or more DSPs, one or more FPGAs. or a combination of at least two of the integrated circuit forms.

For another example, when the unit in the apparatus may be implemented in a form of program invoked by the processing element, the processing element may be a general-purpose processor, for example, a CPU or another processor capable of invoking the program. For another example, the units may be integrated together and implemented in a form of system-on-a-chip (system-on-a-chip, SOC).

In an implementation, the units of the apparatus that implement the corresponding steps in the method may be implemented in a form of program invoked by the processing element. For example, the apparatus may include the processing element and a storage element. The processing element invokes the program stored in the storage element, to perform the method in the foregoing method embodiment.

The storage element may be a storage element located on a same chip as the processing element, that is, an on-chip storage element.

In another implementation, a program for performing the method may be in a storage element located on a different chip from the processing element, that is, an off-chip storage element. In this case, the processing element invokes or loads the program from the off-chip storage element to an on-chip storage element, to invoke and perform the method in the foregoing method embodiment.

For example, an embodiment of this application may further provide an apparatus, for example, an electronic device (for example, the first electronic device or the second electronic device in the foregoing embodiments), which may include a processor and a memory configured to store instructions executable by the processor. When the processor is configured to execute the instructions, the electronic device is enabled to implement the projection reverse control method implemented by the first electronic device or the second electronic device in the foregoing embodiments. The memory may be located in the electronic device, or may be located outside the electronic device. There are one or more processors.

In still another implementation, the units of the apparatus that implement the steps in the method may be configured as one or more processing elements. These processing elements may be disposed on the corresponding electronic device. The processing element herein may be an integrated circuit, for example, one or more ASICs, one or more DSPs, one or more FPGAs, or a combination of these integrated circuits. These integrated circuits may be integrated to form a chip.

For example, an embodiment of this application further provides a chip system. The chip system may be used in the foregoing electronic device. The chip system includes one or more interface circuits and one or more processors. The interface circuit and the processor are interconnected through a line. The processor receives and executes computer instructions from the memory of the electronic device through the interface circuit, to implement the method related to the first electronic device or the second electronic device in the foregoing method embodiment.

An embodiment of this application further provides a computer program product, including computer instructions run by an electronic device, for example, the foregoing electronic device.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or part of the functions described above.

In the several embodiments provided in this application, it should be understood that the disclosed apparatus and method may be implemented in other manners. For example, the described apparatus embodiment is merely an example. For example, the division into modules or units is merely logical function division and may be other division in actual implementation. For example, a plurality of units or components may be combined or integrated into another apparatus, or some features may be ignored or not performed. In addition, the displayed or discussed mutual couplings, direct couplings, or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, may be located in one place, or may be distributed in different places. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit. The integrated unit may be implemented in a form of hardware, or may be implemented in a form of software functional unit.

When the integrated unit is implemented in the form of software function unit and is sold or used as an independent product, the integrated unit may be stored in a readable storage medium. Based on such an understanding, the technical solutions in embodiments of this application essentially, or the part contributing to the conventional technology, or all or a part of the technical solutions may be implemented in the form of software product, for example, a program. The software product is stored in a program product, for example, a computer-readable storage medium, and includes several instructions for enabling a device (which may be a single-chip microcomputer, a chip, or the like) or a processor (processor) to perform all or some of the steps in the method described in embodiments of this application. The foregoing storage medium includes: any medium that can store program code, like a USB flash drive, a removable hard disk, a ROM, a RAM, a magnetic disk, or an optical disc.

For example, an embodiment of this application may further provide a computer-readable storage medium storing computer program instructions thereon. When the computer program instructions are executed by an electronic device, the electronic device is enabled to implement the projection reverse control method in the foregoing method embodiment.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a first electronic device, wherein the method comprises:
sending, to a second electronic device that is coupled to a peripheral device, a projection picture;
establishing a direct connection between the first electronic device and the peripheral device;
receiving, from the peripheral device, a first instruction that is based on a user operation;
performing, according to the first instruction, a corresponding operation; and
sending, to the second electronic device, the projection picture after performing the corresponding operation.

2. The method of claim 1, further comprising:
receiving, from the second electronic device before establishing the connection, connection information for connecting the second electronic device to the peripheral device; and
further establishing, based on the connection information, the connection to the peripheral device.

3. The method of claim 2, wherein receiving the connection information comprises:
receiving the connection information during real-time negotiation protocol parameter negotiation with the second electronic device; or
receiving the connection information when establishing a trusted connection to the second electronic device or logging-in with a same account.

4. The method of claim 2, wherein the connection information comprises a physical address of the peripheral device and a token for connection verification.

5. The method of claim 1, wherein the second electronic device displays the projection picture of the first electronic device in full screen.

6. The method of claim 1, further comprising:
receiving, from the second electronic device, location information of the projection picture on a display of the second electronic device; and
performing, when the location information indicates that the user operation is in the projection picture and according to the first instruction, the corresponding operation.

7. The method of claim 1, further comprising:
receiving, from the peripheral device, a second instruction that is based on a user operation;
receiving, from the second electronic device, location information of the projection picture on a display of the second electronic device; and
skipping executing the second instruction when the location information indicates that the user operation is outside the projection picture.

8. The method of claim 1, further comprising wirelessly coupling to the peripheral device.

9. The method of claim 1, further comprising coupling to the peripheral device through BLUETOOTH or WI-FI.

10. The method of claim 1, wherein the peripheral device comprises any one of a mouse, a keyboard, a stylus, or a handle, wherein the first instruction comprises any one of movement information of the mouse or the stylus or typing information of the keyboard or the handle, and wherein the movement information comprises a movement distance and a movement direction.

11. A first electronic device comprising:
a memory configured to store programming instructions; and
at least one processor coupled to the memory and configured to execute the programming instructions to cause the first electronic device to:
send, to a second electronic device that is coupled to a peripheral device, a projection picture;
establish a direct connection between the first electronic device and the peripheral device;
receive, from the peripheral device, a first instruction that is based on a user operation;
perform, according to the first instruction, a corresponding operation; and
send, to the second electronic device, the projection picture after performing the corresponding operation.

12. The first electronic device of claim 11, wherein the at least one processor is further configured to execute the programming instructions to cause the first electronic device to:
receive, from the second electronic device before establishing the connection, connection information for connecting the second electronic device to the peripheral device; and
establish, based on the connection information, the connection to the peripheral device.

13. The first electronic device of claim 12, wherein the at least one processor is further configured to execute the programming instructions to cause the first electronic device to:
receive the connection information during real-time negotiation protocol parameter negotiation with the second electronic device; or
receive the connection information when establishing a trusted connection to the second electronic device or logging-in with a same account.

14. The first electronic device of claim 12, wherein the connection information comprises a physical address of the peripheral device and a token for connection verification.

15. The first electronic device of claim 11, wherein the second electronic device displays the projection picture of the first electronic device in full screen.

16. The first electronic device of claim 11, wherein the at least one processor is further configured to execute the programming instructions to cause the first electronic device to:
receive, from the second electronic device, location information of the projection picture on a display of the second electronic device; and
perform, when the location information indicates that the user operation is in the projection picture and according to the first instruction, the corresponding operation.

17. The first electronic device of claim 11, wherein the at least one processor is further configured to execute the programming instructions to cause the first electronic device to:
receive, from the peripheral device, a second instruction that is based on a user operation;
receive, from the second electronic device, location information of the projection picture on a display of the second electronic device; and
skip executing the second instruction when the location information indicates that the user operation is outside the projection picture.

18. The first electronic device of claim 11, wherein the second electronic device and the first electronic device are wirelessly coupled to the peripheral device.

19. The first electronic device of claim 11, wherein the second electronic device and the first electronic device are coupled to the peripheral device through BLUETOOTH or WI-FI.

20. A method applied to a projection system, wherein the projection system comprises a first electronic device and a second electronic device that are connected to each other, wherein a peripheral device is connected to the second electronic device, and wherein the peripheral device is configured to perform operation control on a picture displayed by the second electronic device, the method comprising:
sending, by the first electronic device, a projection picture to the second electronic device;
receiving and displaying, by the second electronic device, the projection picture;
establishing, by the first electronic device, a direct connection to the peripheral device;
generating, by the peripheral device in response to a user operation, a first instruction that is based on the user operation;
sending, by the peripheral device, the first instruction to the first electronic device;

receiving, by the first electronic device, the first instruction;
performing, by the first electronic device, a corresponding operation according to the first instruction;
sending, by the first electronic device to the second electronic device, the projection picture after the corresponding operation is performed;
receiving, by the second electronic device, the projection picture from the first electronic device after the corresponding operation is performed; and
displaying the projection picture.

\* \* \* \* \*